US009892104B2

(12) United States Patent
Haynes, II et al.

(10) Patent No.: US 9,892,104 B2
(45) Date of Patent: Feb. 13, 2018

(54) SYSTEM FOR AND METHOD OF ANNOTATION OF DIGITAL CONTENT AND CREATION OF COLLECTIONS OF ANNOTATIONS OF DIGITAL CONTENT

(75) Inventors: Raymond Lee Haynes, II, Smithville, MO (US); Dave Nelson, New York, NY (US); Robb Smigielski, Kansas City, MO (US); Brian Cunningham, Kansas City, MO (US); Tyler Hilker, Kansas City, MO (US)

(73) Assignee: COPIA INTERACTIVE, LLC, New York, NY (US)

( * ) Notice: Subject to any disclaimer, the term of this patent is extended or adjusted under 35 U.S.C. 154(b) by 0 days.

(21) Appl. No.: 12/894,062

(22) Filed: Sep. 29, 2010

(65) Prior Publication Data

US 2012/0036423 A1 Feb. 9, 2012

Related U.S. Application Data

(60) Provisional application No. 61/370,771, filed on Aug. 4, 2010, provisional application No. 61/374,518, filed
(Continued)

(51) Int. Cl.
*G06F 17/00* (2006.01)
*G06F 17/24* (2006.01)
*G06Q 30/02* (2012.01)

(52) U.S. Cl.
CPC ....... *G06F 17/241* (2013.01); *G06Q 30/0201* (2013.01)

(58) Field of Classification Search
CPC .................................................. G06F 17/241
(Continued)

(56) References Cited

U.S. PATENT DOCUMENTS 5,146,552 A * 9/1992 Cassorla ............... G06F 17/241
715/200
6,438,564 B1 8/2002 Morton et al.
(Continued)

OTHER PUBLICATIONS

International Search Report, for International Application No. PCT/US2010/50784, dated Nov. 23, 2010, pp. 1-2.
(Continued)

*Primary Examiner* — Scott Baderman
*Assistant Examiner* — Benjamin J Smith
(74) *Attorney, Agent, or Firm* — Oblon, McClelland, Maier & Neustadt, L.L.P.

(57) ABSTRACT

The present invention provides a system for and a method of collaborative annotation of digital content. In accordance with an embodiment of the present invention, a method of annotating digital content is provided. An annotation related to a portion of a volume of digital content is created. The annotation is stored in computer-readable memory in a manner that maintains a logical connection between the annotation and the portion of the volume of the digital content. The annotation is created by a first user. A comment is created by a second user in response to the annotation. The comment is stored in computer-readable memory in a manner that maintains a logical connection between the comment and the annotation. The portion of the volume of the digital content is displayed together with at least an identification of the annotation and at least an identification of the comment.

26 Claims, 26 Drawing Sheets

Related U.S. Application Data on Aug. 17, 2010, provisional application No. 61/375,225, filed on Aug. 19, 2010.

(58) Field of Classification Search
USPC .................................................. 715/230–232
See application file for complete search history.

(56) References Cited

U.S. PATENT DOCUMENTS

| | | | | |
|---|---|---|---|---|
| 6,956,593 B1* | 10/2005 | Gupta | G06F 17/22 | 707/E17.009 |
| 7,051,274 B1* | 5/2006 | Cottrille | G06F 17/241 | 709/223 |
| 7,103,848 B2* | 9/2006 | Barsness | G06F 17/241 | 715/776 |
| 7,266,765 B2* | 9/2007 | Golovchinsky | G06F 17/241 | 715/205 |
| 7,418,656 B1* | 8/2008 | Petersen | G06F 17/241 | 715/230 |
| 7,480,669 B2 | 1/2009 | Lo et al. | | |
| 7,519,900 B2* | 4/2009 | Zaher et al. | | 715/230 |
| 7,546,524 B1* | 6/2009 | Bryar | G06F 3/04883 | 715/230 |
| 7,636,883 B2* | 12/2009 | Albornoz | G06F 17/2247 | 715/231 |
| 7,779,347 B2* | 8/2010 | Christiansen | G06F 17/241 | 715/230 |
| 7,793,233 B1* | 9/2010 | Sellers | G06F 17/241 | 715/780 |
| 7,870,480 B1* | 1/2011 | Oswald | G06F 17/241 | 715/230 |
| 8,015,482 B2* | 9/2011 | Simova | G06F 17/2247 | 715/230 |
| 8,078,958 B2* | 12/2011 | Cottrille | G06F 17/241 | 715/230 |
| 8,131,647 B2* | 3/2012 | Siegel | G06F 17/30038 | 705/57 |
| 8,261,182 B1* | 9/2012 | Petersen | G06F 17/241 | 715/230 |
| 8,510,646 B1* | 8/2013 | Young | G06F 17/241 | 715/230 |
| 8,533,586 B1* | 9/2013 | Meyer | G06F 17/241 | 715/230 |
| 8,640,023 B1* | 1/2014 | Murray | G06F 17/241 | 715/230 |
| 2002/0059272 A1* | 5/2002 | Porter | G06F 17/3061 | |
| 2003/0004991 A1* | 1/2003 | Keskar | G06F 17/241 | 715/230 |
| 2003/0009459 A1* | 1/2003 | Chastain | G06F 17/241 | |
| 2003/0076352 A1* | 4/2003 | Uhlig | G06F 17/241 | 715/738 |
| 2004/0078757 A1* | 4/2004 | Golovchinsky | G06F 17/241 | 715/205 |
| 2004/0201633 A1* | 10/2004 | Barsness | G06F 17/241 | 715/864 |
| 2004/0267798 A1* | 12/2004 | Chatterjee | G06F 17/241 | |
| 2005/0050460 A1* | 3/2005 | Bedingfield, Sr. | G06F 17/3089 | 715/205 |
| 2005/0065799 A1* | 3/2005 | Dare | G06F 21/6245 | 705/50 |
| 2005/0091027 A1* | 4/2005 | Zaher | G06F 17/2229 | 703/22 |
| 2005/0091578 A1* | 4/2005 | Madan | G06F 17/241 | 715/201 |
| 2006/0048047 A1* | 3/2006 | Tao | G06F 17/241 | 715/232 |
| 2006/0053364 A1 | 3/2006 | Hollander et al. | | |
| 2006/0212795 A1* | 9/2006 | Cottrille | G06F 17/241 | 715/205 |
| 2006/0242554 A1 | 10/2006 | Gerace et al. | | |
| 2006/0282762 A1* | 12/2006 | Diamond | G06F 17/241 | 715/235 |
| 2006/0282778 A1* | 12/2006 | Barsness | G06F 17/241 | 715/726 |
| 2007/0055926 A1* | 3/2007 | Christiansen | G06F 17/241 | 715/210 |
| 2007/0143663 A1* | 6/2007 | Hansen | G06F 17/241 | 715/203 |
| 2007/0271502 A1* | 11/2007 | Bedi | G06F 17/248 | 715/230 |
| 2007/0288839 A1* | 12/2007 | Kurosawa | G06F 17/241 | 715/751 |
| 2007/0298399 A1* | 12/2007 | Shao | G06F 17/241 | 434/317 |
| 2008/0005064 A1* | 1/2008 | Sarukkai | G06F 17/241 | |
| 2008/0168073 A1* | 7/2008 | Siegel | G06F 17/3002 | |
| 2008/0222552 A1* | 9/2008 | Batarseh | G06F 3/0483 | 715/776 |
| 2009/0249224 A1* | 10/2009 | Davis | G06F 17/241 | 715/753 |
| 2009/0254802 A1 | 10/2009 | Campagna et al. | | |
| 2009/0299824 A1 | 12/2009 | Barnes, Jr. | | |
| 2009/0327855 A1* | 12/2009 | Le | G06F 17/30882 | 715/230 |
| 2010/0031135 A1* | 2/2010 | Naghshin | G06Q 10/10 | 715/230 |
| 2010/0262659 A1* | 10/2010 | Christiansen | G06F 17/241 | 709/205 |
| 2011/0026898 A1* | 2/2011 | Lussier | G11B 27/034 | 386/280 |
| 2011/0087955 A1* | 4/2011 | Ho | G06F 17/211 | 715/230 |
| 2014/0122991 A1* | 5/2014 | Achillopoulos | G06F 17/2785 | 715/230 |

OTHER PUBLICATIONS

Written Opinion of the International Searching Authority, for International Application No. PCT/US2010/50784, dated Nov. 23, 2010, pp. 1-4.

"Kobo Debuts Social Reading Application for Blackberry Smartphones," Sep. 28, 2010, Kobo, Inc., p. 1.

"RIM Announces BBM Social Platform," Sep. 27, 2010, Research in Motion, pp. 1-2.

Extended European Search Report issued in European Patent Application No. 10855723.2 dated Jan. 9, 2017.

* cited by examiner

FIG. 2

```
Copia [Running]                                            _ □ ×
File  Edit  Account  Help
                                                20 Eric Peterson | Sign off
⇦ ⇨ |82|/374| ⊕ ⊖ |100%| ⊕ ⊖    🖉 ▾  📖 ▾  📚 ▾  📇  ᵃᵉ  📖  Search Library
 Home | Eat,Pray,Love,... | The Road | The Lost Symbol | + |
``` they were required to be on duty until the office closed, and on these
nights it was seldom that I reached home before eleven o'clock. On the
alternating nights we were relieved at six. This did not leave time for
self-improvement, nor did the wants of the family leave
any money to spend on books. There came, however, like a blessing from
above, a means by which the treasures of literature were unfolded to me.
Colonel James Anderson—I bless his name as I write—announced that he
would open his library of four hundred volumes to boys, so that any
young man could take out, each Saturday afternoon, a book which could
be exchanged for another on the succeeding Saturday. My friend, Mr.
Thomas N. Miller, reminded me recently that Colonel Anderson's books
were first opened to "working boys," and the question arose whether
messenger boys, clerks, and others, who did not work with their hands,
were entitled to books. My first communication to the press was a note,
written to the "Pittsburgh Dispatch," urging that we should not be
excluded; that although we did not now work with our hands, some of us
had done so, and that we were really working boys. Dear Colonel
Anderson promptly enlarged the classification. My first appearance as a
writer was a success.
My dear friend, Tom Miller, one of the inner circle, lived near Colonel
Anderson, and introduced me to him, and in this way the windows were
opened in the walls of my dungeon through which the light of knowledge
streamed in. Every day's toil and even the long hours of night service were
lightened by the book which I carried about with me and read in the
intervals that could be snatched from duty. And the future was made
bright by the thought that when Saturday came a new volume could be ob-

82/374

| Contents | Annotations | Search |
105 Notes (of 12000)  FILTER|OPTIONS

_Username_             _Timestamp_
PG.  "first few characters of content..
29   if it were a little longer like..."

_Username_             _Timestamp_
PG.  "first few characters of context..
29   first few characters of content..."

_Username_             _Timestamp_
PG.  "first few characters of context..
30   first few characters of content..."

_Username_             _Timestamp_
PG.  |Spoiler Alert|
30

_Username_             _Timestamp_
PG.  "first few characters of context..
39   first few characters of content..."

_Username_             _Timestamp_
PG.  "first few characters of content..
39   if it were a little longer like..."

_Username_             _Timestamp_
PG.  first few characters of content
39   if it were a little longer like...

_Username_             _Timestamp_

Copia [Running]
File  Edit  Account  Help

← → 82 /374  ⊖ ⊕ 100%  ▾  ▸  ✎ ▾  □  ✐                    🖶  🔤  🗐  🗏  Search Library    20 Eric Peterson | Sign off Home | Eat,Pray,Love... | The Road | The Lost Symbol | + they were required to be on duty until the office closed, and on these nights it was seldom that I reached home before eleven o'clock. On the alternating nights we were relieved at six. This did not leave time for self-improvement, nor did the wants of the family leave any money to spend on books. There came, however, like a blessing from above, a means by which the treasures of literature were unfolded to me. Colonel James Anderson-I bless his name as I write-announced that he would open his library of four hundred volumes to boys, so that any young man could take out, each Saturday afternoon, a book which could be exchanged for another on the succeeding Saturday. My friend, Mr. Thomas N. Miller, reminded me recently that Colonel Anderson's books were first opened to "working boys," and the question arose whether messenger boys, clerks, and others, who did not work with their hands, were entitled to books. My first communication to the press was a note, written to the "Pittsburgh Dispatch," urging that we should not be excluded; that although we did not now work with our hands, some of us had done so, and that we were really working boys. Dear Colonel Anderson promptly enlarged the classification. My first appearance as a writer was a success.

My dear friend, Tom Miller, one of the inner circle, lived near Colonel Anderson, and introduced me to him, and in this way the windows were opened in the walls of my dungeon through which the light of knowledge streamed in. Every day's toil and even the long hours of night service were lightened by the book which I carried about with me and read in the intervals that could be snatched from duty. And the future was made bright by the thought that when Saturday came a new volume could be ob-

82/374

Contents | Annotations | Search
105 Notes (of 12000) FILTER OPTIONS
first few characters of content...
Username            Timestamp
PG. ANNOTATIONS
30  2
PG. "first few characters of context." >
30  first few characters of content...
Username            Timestamp
PG. Spoiler Alert <
30
Username            Timestamp
PG. ANNOTATIONS
32  25
PG. ANNOTATIONS
39  102
PG. "first few characters of context." >
39  first few characters of content >
Username            Timestamp
PG. "first few characters of content >
39  if it were a little longer like..."
Username            Timestamp
PG. first few characters of content >
39  if it were a little longer like...
Username            Timestamp

Copia [Running]
File  Edit  Account  Help

My Home | The Road ⊗ | A Tale of Two Cities ⊗ | Eat,Pray,Love: One Womans... ⊗ | +

← → | 9999 / 9999 | ⊕ ⊖ | 100% | 📖 | ✎ | ✏ | 🔖 | 🔲 | 🎚 | Ⓐ | 🔍
Navigate | Zoom | History | Make Note | Highlight | Bookmark | Sidebar | Markings | Page Prefs | Search this title

82 / 374

Contents | Annotations | Search
SAVE A COPY
< Back to List
Note Details | Comments (34)

by: Username
Created:  Timestamp
Copied:   Timestamp
Modified: Timestamp

📝 Highlight Note

...Gilbert (The Last American Man) grafts the structure of romantic fiction upon inquiries of reporting in this sprawling...

Gilbert (The Last American Man) grafts the structure of romantic fiction upon inquiries of reporting in this sprawling yet rhetorical travelogue of soul-searching and self-discovery.

Eat, Pray, Love: One Woman's Search for Everything...
Elizabeth Gilbert
pg 39

👍 You and 45 people liked this note.
You and 12 people copied this note.

Tags: Travel, India, spirituality
Collections: Collection 1, Collection 2 they were required to be on duty until the office closed, and on these nights it was seldom that I reached home before eleven o'clock. On the alternating nights we were relieved at six. This did not leave time for self-improvement, nor did the wants of the family leave any money to spend on books. There came, however, like a blessing from above, a means by which the treasures of literature were unfolded to me. Colonel James Anderson—I bless his name as I write—announced that he would open his library of four hundred volumes to boys, so that any young man could take out, each Saturday afternoon, a book which could be exchanged for another on the succeeding Saturday. My friend, Mr. Thomas N. Miller, reminded me recently that Colonel Anderson's books were first opened to "working boys," and the question arose whether messenger boys, clerks, and others, who did not work with their hands, were entitled to books. My first communication to the press was a note, written to the "Pittsburgh Dispatch," urging that we should not be excluded; that although we did not now work with our hands, some of us had done so, and that we were really working boys. Dear Colonel Anderson promptly enlarged the classification. My first appearance as a writer was a success.

My dear friend, Tom Miller, one of the inner circle, lived near Colonel Anderson, and introduced me to him, and in this way the windows were opened in the walls of my dungeon through which the light of knowledge streamed in. Every day's toil and even the long hours of night service were lightened by the book which I carried about with me and read in the intervals that could be snatched from duty. And the future was made bright by the thought that when Saturday came a new volume could be ob-

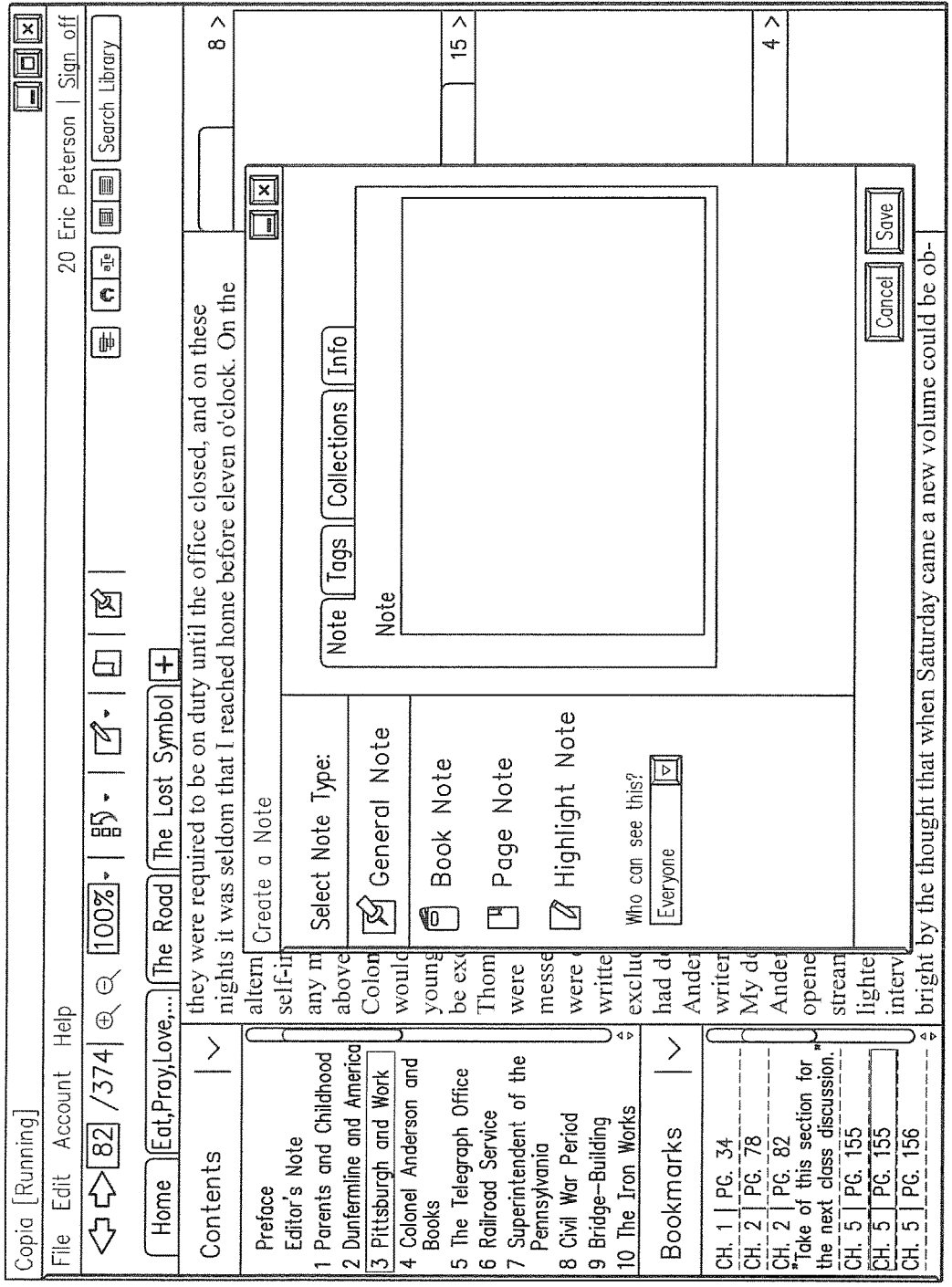

FIG. 13

```
Copia [Running]                                              _ □ ×
File  Edit  Account  Help
My Home │ The Road ⊗ │ A Tale of Two Cities ⊗ │ Eat,Pray,Love: One Womans... ⊗ │ +
← → │ 9999 /9999 │ ⊕ ⊖ 100% │ 🖉 │ ✎ │ 📖 │ 🔖 │ ⬜ │ ⋮⋮⋮ │
Navigate │       │ Zoom │ History │ Make Note │ Highlight │ Bookmark │ Sidebar │ Markings │ A Page Prefs │ 🔍 Search this title
``` they were required to be on duty until the office closed, and on these nights it was seldom that I reached home before eleven o'clock. On the alternating nights we were relieved at six. This did not leave time for self-improvement, nor did the wants of the family leave any money to spend on books. There came, however, like a blessing from above, a means by which the treasures of literature were unfolded to me. Colonel James Anderson—I bless his name as I write-announced that he would open his library of four hundred volumes to boys, so that any young man could take out, each Saturday afternoon, a book which could be exchanged for another on the succeeding Saturday. My friend, Mr. Thomas N. Miller, reminded me recently that Colonel Anderson's books were first opened to "working boys," and the question arose whether messenger boys, clerks, and others, who did not work with their hands, were entitled to books. My first communication to the press was a note, written to the "Pittsburgh Dispatch," urging that we should not be excluded; that although we did not now work with our hands, some of us had done so, and that we were really working boys. Dear Colonel Anderson promptly enlarged the classification. My first appearance as a writer was a success.

My dear friend, Tom Miller, one of the inner circle, lived near Colonel Anderson, and introduced me to him, and in this way the windows were opened in the walls of my dungeon through which the light of knowledge streamed in. Every day's toil and even the long hours of night service were lightened by the book which I carried about with me and read in the intervals that could be snatched from duty. And the future was made bright by the thought that when Saturday came a new volume could be ob-

| 82/374 | Contents │ Annotations │ Search |
|---|---|
| | Notes (105 of 12000) |
| | PG. ANNOTATIONS |
| | 39  25 |
| | PG. "first few characters of content..." |
| | 29  if it were a little longer like.... |
| | Username          Timestamp |
| | PG. "first few characters of context..." |
| | 29  first few characters of content... |
| | Username          Timestamp |
| | PG. ANNOTATIONS |
| | 39  10 |
| | PG. "first few characters of content..." |
| | 30  first few characters of content... |
| | Username          Timestamp |
| | PG. "first few characters of context..." |
| | 39  first few characters of content... |
| | Username          Timestamp |
| | PG. first few characters of content |
| | 39  if it were a little longer like... |
| | Username          Timestamp |
| | PG. first few characters of content |
| | 39  if it were a little longer like... |
| | Username          Timestamp |
| | PG. first few characters of content |
| | 39  first few characters of content |

FIG. 14

Copia [Running]
File  Edit  Account  Help
My Home | The Road ⊗ | A Tale of Two Cities ⊗ | Eat,Pray,Love: One Womans... ⊗ | +
← → | 9999 /9999 | ⊖ ⊕ | 100% ▾ |   | A  | Search this title 🔍
Navigate |           | Zoom         | History | Make Note | Highlight | Bookmark | Sidebar | Markings | Page Prefs they were required to be on duty until the office closed, and on these
nights it was seldom that I reached home before eleven o'clock. On the
alternating nights we were relieved at six. This did not leave time for
self-improvement, nor did the wants of the family leave
any money to spend on books. There came, however, like a blessing from
above, a means by which the treasures of literature were unfolded to me.
Colonel James Anderson-I bless his name as I write-announced that he
would open his library of four hundred volumes to boys, so that any young
man could take out, each Saturday afternoon, a book which could be
exchanged for another on the succeeding Saturday. My friend, Mr.
Thomas N. Miller, reminded me recently that Colonel Anderson's books
were first opened to "working boys," and the question arose whether
messenger boys, clerks, and others, who did not work with their hands,
were entitled to books. My first communication to the press was a note,
written to the "Pittsburgh Dispatch," urging that we should not be
excluded; that although we did not now work with our hands, some of us
had done so, and that we were really working boys. Dear Colonel
Anderson promptly enlarged the classification. My first appearance as a
writer was a success. Lorem ipsum [word].
My dear friend, Tom Miller, one of the inner circle, lived near Colonel
Anderson, and introduced me to him, and in this way the windows were
opened in the walls of my dungeon through which the light of knowledge
streamed in. Every day's toil and even the long hours of night service were
lightened by the book which I carried about with me and read in the
intervals that could be snatched from duty. And the future was made
bright by the thought that when Saturday came a new volume could be ob-

82/374

Contents | Annotations | Search
Notes (1,211)                FILTER|OPTIONS
BOOK | MY NOTES | COMMUNITY  ▾
NOTE 1 | 20
↻ Refresh to load most recent notes
BOOK  *This is a book note entry that* ›
NOTE  *is attached to only the book...*
      Username            Timestamp
BOOK  *This is a book note entry that* ›
NOTE  *is attached to only the book...*
      Username            Timestamp
─────────────────────────────────
PG. | MY NOTES | COMMUNITY  ▾
39  | 1        | 9
↻ Refresh to load most recent notes
PG.   *"first few characters of context..."* ›
39    *first few characters of content...*
      Username            Timestamp
PG.   *first few characters of content* ›
39    *if it were a little longer like...*
      Username            Timestamp
PG.   *first few characters of content* ›
39    *if it were a little longer like..."*
      Username            Timestamp
✓ All community notes are not

SYSTEM FOR AND METHOD OF ANNOTATION OF DIGITAL CONTENT AND CREATION OF COLLECTIONS OF ANNOTATIONS OF DIGITAL CONTENT

This application claims the benefit of U.S. Provisional Application No. 61/370,771, filed Aug. 4, 2010, U.S. Provisional Application No. 61/374,518, filed Aug. 17, 2010, and U.S. Provisional Application No. 61/375,225, filed Aug. 19, 2010. The entire contents of each of these provisional applications are hereby incorporated by reference.

BACKGROUND OF THE INVENTION

The present invention relates to the field of electronically distributed digital content, such as e-books. More particularly, the present invention relates to interactive collaboration among consumers of digital content.

An electronic book (also referred to as an e-book) is an electronic version of a traditional print book that can be downloaded (e.g. via the Internet) to a general-purpose computer system or to a portable electronic device. Text of the e-book is displayed on a display screen of the general-purpose computer system or portable device so that it can be read. An e-book reader can be a dedicated device or software stored on a programmable device that enables the reading of an e-book. Digital content is available in other forms, such as video, audio and text files, as well as multi-media presentations and files, such as electronic games and magazines.

E-books, for example, have certain advantages over traditional print books, including convenience and cost savings which come from: the ability to electronically distribute the content; preservation of natural resources which would otherwise be required for the manufacture and distribution of print books; and the convenience of allowing the consumer to electronically store many e-books, as opposed to print books which occupy shelf space and can be heavy to carry.

A drawback of e-books and other digital content is that it can be more difficult for a consumer to make and share written comments or other annotations. Consumers of traditional print books may be accustomed to taking actions such as making written comments in the margins, underlining or highlighting text and marking certain pages (by turning down the page corners or by using a bookmark). However, these actions cannot generally be performed on an e-book and other digital content while it is being displayed.

Therefore, what is needed is are improved techniques for annotating digital content, such as e-books. What is further needed are improved techniques for a plurality of persons to collaboratively annotate digital content.

SUMMARY OF THE INVENTION

The present invention provides a system for and a method of collaborative annotation of digital content. In accordance with an embodiment of the present invention, a method of annotating digital content is provided. An annotation related to a portion of a volume of digital content is created. The annotation is stored in computer-readable memory in a manner that maintains a logical connection between the annotation and the portion of the volume of the digital content. The annotation is created by a first user. A comment is created by a second user in response to the annotation. The comment is stored in computer-readable memory in a manner that maintains a logical connection between the comment and the annotation. The portion of the volume of the digital content is displayed together with at least an identification of the annotation and at least an identification of the comment.

BRIEF DESCRIPTION OF THE DRAWINGS

The present invention is described with respect to particular exemplary embodiments thereof and reference is accordingly made to the drawings in which:

FIG. 2 illustrates a screen display for unthreaded notes (in "mini" view mode) in accordance with an embodiment of the present invention;

FIG. 3 illustrates a screen display for unthreaded notes (in "full" view mode) in accordance with an embodiment of the present invention;

FIG. 4 illustrates a screen display for threaded notes "mini" view mode) in accordance with an embodiment of the present invention;

FIG. 5 illustrates a screen display for threaded notes (in "full" view) in accordance with an embodiment of the present invention;

FIG. 6 illustrates a screen display for an options menu in accordance with an embodiment of the present invention;

FIG. 8 illustrates a view of note details in accordance with an embodiment of the present invention;

FIG. 9 illustrates a view of note details in accordance with an alternative embodiment of the present invention;

FIG. 10 shows a screen display for a save a copy feature in accordance with an embodiment of the present invention;

FIG. 11 illustrates a screen display for comments on a note in accordance with an embodiment of the present invention;

FIG. 12 illustrates a screen display for creating a general note in accordance with an embodiment of the present invention;

FIG. 13 illustrates a screen display showing book notes in accordance with an embodiment of the present invention;

FIG. 14 illustrates a screen display showing book notes in accordance with an alternative embodiment of the present invention;

FIG. 15 illustrates a screen display for creating a book note in accordance with an embodiment of the present invention;

FIG. 16 illustrates a display screen for entering and viewing tags for a book note in accordance with an embodiment of the present invention;

FIG. 18 illustrates a screen display of book information in accordance with an embodiment of the present invention;

FIG. 19 illustrates a screen display for creating a page note in accordance with an embodiment of the present invention;

FIG. 20 illustrates a screen display for a creating highlight note in accordance with an embodiment of the present invention;

FIG. 21 illustrates a screen display for filtering notes by type in accordance with an embodiment of the present invention;

FIG. 22 illustrates a screen display for filtering notes by tags in accordance with an embodiment of the present invention;

FIG. 23 illustrates a screen display for filtering notes by collections in accordance with an embodiment of the present invention;

FIG. 24 illustrates a screen display for filtering notes by people in accordance with an embodiment of the present invention;

FIG. 25 illustrates a screen display for filtering notes by groups in accordance with an embodiment of the present invention; and FIG. 26 illustrates a screen display for filtering notes by timeframe in accordance with an embodiment of the present invention.

DETAILED DESCRIPTION OF A PREFERRED EMBODIMENT OF THE INVENTION

The present invention allows a user to create and share annotations (or "notes") regarding digital content with other users as well as read and comment on annotations that other users have created, within the context of digital content. An annotation can be written. For example, the user can create an annotation relating to content of an e-book while the user is reading the e-book. The annotation can be associated with a specific portion of the content, such as a page or line(s) of text with an e-book. The user can also share the annotation with selected other users of the content. Thus, while reading an e-book, the user can view annotations written by other readers of that e-book. More particularly, while reading a particular passage within the e-book, the user can view annotations written by other users that relate to that same passage.

A user may comment on annotations made by other users while other users may comment on the user's annotations. By associating an annotation with a specific portion of the content and allowing others to comment on the annotation, this allows a discussion among the users on topics relating to the specified portion of the content. This creates a collaborative sharing experience that is richer than would be obtained by simply reading another person's review of a book or other content. Filtering can be employed so that user can choose specific users whose annotations they wish to view and comment on.

This collaborative annotation system and method can be applied to other forms of digital content, including video and audio files by allowing a user to attach a note to a specific passage or portion of a video and audio file (e.g. by associating the note with a timestamp within a video or audio file). Thus, a user can specify a particular timestamp within the video or audio file. The collaborative annotation can also be applied to multi-media presentations, such as a digital magazine which includes text and pictures. Thus, when reading a magazine the user may not only annotate the text but also pictures and/or associated captions.

Figure 1:
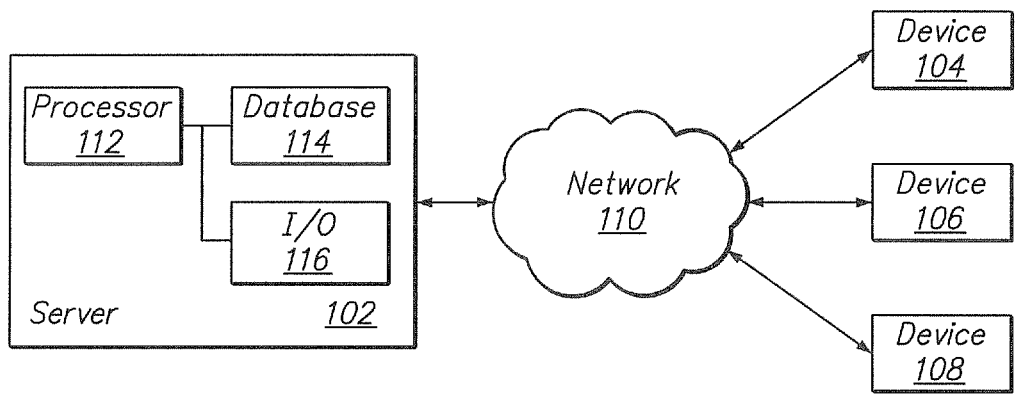
FIG. 1 illustrates a system that may be used to collaboratively annotate digital content in accordance with an embodiment of the present invention.

FIG. 1 illustrates a system 100 in which digital content may be collaboratively annotated in accordance with an embodiment of the present invention. As shown in FIG. 1, a server 102 is communicatively coupled to a plurality of remote devices 104, 106, and 108 via a network 110. While three such devices 104, 106, and 108 are shown, it will be understood that a different number of devices may be employed. The a server 102 includes a processor 112, a database 114 and input/output devices 116, which may include a display, a keyboard, a mouse, and a network interface. The network 110 may include, for example, a local area network, an intranet, and/or a wide area network, such as the Internet. The remote devices 104, 106, 108, may be implemented as various computing devices having a display screen, such as a desktop or portable personal computer, a "smart" phone, e-book reader device, a PDA or other device. A user accesses the server 102 by using a remote device 104, 106 or 108. For example, the server 102 may host a website portal which can be accessed by users of the devices 104, 106 or 108. The remote devices 104, 106, 108 may communicate with the server 102 and/or with each other by wireless or wired connections.

In an embodiment, digital content, such as e-books, are initially stored at the server 102. Users can access the content by downloading individual files, such as an e-book file, to a remote device 104, 106 or 108 and/or by viewing the content using a display screen of a remote device 104, 106 or 108. The users can perform other actions described herein, via communication with the server 102 and/or with other remote devices 104, 106 or 108.

In addition to accessing the content, each user can engage in other interactions, including creating, viewing and commenting on annotations within the context of the digital content. As used herein the term "title" or "volume" refer to a particular work of digital content, such as a particular e-book, video file or multi-media presentation.

Users (which may also be referred to as readers or consumers) of content may select a particular title, portion of the title or location within the title to be associated with an annotation created by the user. The annotation can be written commentary or other type of additional content such as an audio recording in which the user provides spoken commentary or any other digital media such as a photograph or video file. The annotation is stored in a manner that maintains its association with the particular title, portion of the title and/or location within the title that is selected by the user. For example, an annotation may be created by the user using the user's remote device 102, 104 or 106. The annotation may then be communicated to the server 102 along with information that identifies the particular title, portion of the title and/or location within the title, as selected by the user. The server 102 then stores the annotation, the information that identifies the particular title, portion of the title and/or location within the title, as selected by the user, as well as information that identifies the user (e.g. the user's login id). The server 102 may also store a timestamp that identifies a time and date associated with the annotation.

The digital content which can be stored by the server 102 and accessed by users includes digital information that can delivered to users in a variety of formats, including: e-books (epub, PDF, HTML, and other industry standards), audio files (downloadable files and streaming audio), video files (downloadable files and streaming video), games (which can be a downloadable file played through an interface that is separate from that used for collaborative annotation, or directly through this same interface), as well as other digital format types, or collateral non-electronic products. The collaborative annotation can be applied to anything that a user can express an opinion about, and would benefit from an iterative understanding in their decision-making regarding the content, such as whether to view or purchase the content.

Users can indicate the location of something noteworthy (e.g., by highlighting text or by book marking a page). Based upon the reader's selected setting for the title or a default setting, other viewers can see when a portion of the volume has been indicated.

The user's annotations can be added as text, tags or additional settings to the indicated location in the title. Annotation entry can be inputted via a number of entry methods such as: typing, recording audio, handwriting, movement/gesture, etc.

Users also have an opportunity to capture thoughts that aren't tied to a location in a volume of content (since ideas worth recording are not always tethered to content). This may be accomplished by associating the user's additional content with the particular title only, and not with any location within the title. This can allow users to participate in a broader freeform collaborative discussion regarding the title.

A "tag" is a term or phrase that can represent categories or provide other information out the item. For example, the tags for a book or e-book can identify its author, genre, themes of the book, key words related to its content or any other information or topics related to the book. Specific examples of tags may include: "New York Times Bestseller," "mystery," "romance," "J. D. Salinger," "phonies," "banned," "modern," "fiction," "nature," "poignant," "classic," "boring," etc. In a preferred embodiment, the tags include user-generated tags. For example, the user can then enter one or more tags selected by the user while viewing a particular title. The tags are then stored at the server 102 in a manner that maintains an association between the tag the title, portion of the title and/or location within the title that is selected by the user.

Users preferably have an ability to easily retrieve information out of context, yet some subtext is preferably retained in an easily recognizable form. Leveraging the user-generated folksonomy through tags, users are able to record additional metadata about the capture process for later use. Other elements that enable useful retention and that can be included in metadata associated with the annotation include: time captured, annotation author, volume title, content author, associated groups, number of comments, note type, etc.

An annotation can be accessed within an open volume and is viewable in context. In other words, while the user is viewing a particular portion of the content, annotations of other users that relate to that portion of the content are accessible to the user. Additionally, the user can preferably search for an annotation related to a particular title or portions of the title so multiple related annotations are viewable by the user. The user can also preferably display annotations of other users separately of other related annotations. Thus, notes may be provided to a user contemporaneously of their creation though the user may not be viewing the content at that time. For example, the user may subscribe to activity feeds or receive a text or email message in response to annotations created by specified other users and content. Thus, members of a group may receive annotations created by other group members for a particular title selected by the group.

A user can preferably specify other users who will be entitled to view annotations created by the user and to comment on those annotations. For example, the user may have a choice of: keeping the annotation private (only viewable by the user); making the annotation available to specified friends only; (e.g. by specifying particular individual users or by specifying a particular group); and making the annotation public. For example, a public annotation may be visible to all visitors to the website (including both general public and account-holding users) or only to account-holding users.

Annotations are generally created and stored at the devices 104, 106, and 108 and then communicated to the server 102 together with their associated metadata where the annotations and metadata are aggregated and stored. Multiple annotations may be aggregated and stored on a device before communication to the server 102. Communication to the server 102 may be performed as background processes on the devices 104, 106 and 108 so as to minimize impact on the user. For example, a user may create several annotations for a particular title which are then aggregated and stored on the user's device together with their associated metadata until such time as the user's device is otherwise idle or upon logging in or off at the server 102. The user's device may then communicate the annotations and their metadata to the server 102. Additionally, annotations may be communicated from one user's device 104, 106 and 108 to another device 102, 104 and 106 (e.g., by wireless communication) where they are aggregated and stored before being uploaded to the server 102. Annotations, their metadata and other information may be distributed from the server 102 to remote devices 104, 106, and 108 at specified times. For example, the remote devices belonging to members of a particular group may receive annotations created by other members of the group. The users may receive new annotations upon connection or logging in of the devices to the server 102 (this may be referred to an on-connection synchronization). Or, if already connected, members of the group may receive annotations as they become available in real time (this may be referred to as real-time push or pull).

Commenting refers to a user responding or adding to another user's annotation. A comment is a new annotation that is associated with a prior annotation. Continents can be created on the remote devices 104, 106 and 108 and communicated to the server 102 where they are aggregated and stored in the same manner as original annotations. Comments are associated with the original annotation, such as by including within metadata for the comment an identification of the original annotation. Moreover, metadata for comments can include: time captured, comment author, volume title, content author, associated groups, number of comments, comment type, etc. An annotation and related comments are referred to as a "thread."

Comments may be displayed in real-time on connected devices. A user who creates comments can preferably select whether the comment will be available to any user to whom anywhere the original annotation is viewable or to make the comment available only to specified users or to a particular group. Thus, for a thread, the viewer can either specify the comment as public (inheriting the visibility of the source material), anonymous (where any personally identifiable information is removed from the comment), private (only viewed by the author of the commented-upon note) or only available to selected users or groups.

When a user is viewing content, such as reading a book, the user may make an annotation and tie it to a specific portion of text in the book, to a specific page in the book or to the overall book itself. They may do this by clicking a "Note" button within a reading tool bar. They may then be provided with a dialog box that allows them to add their note text, tag their note and add it to a note collection. Once the annotation is created it will be stored in a database and tied to the specific book ID, page number and text, as applicable.

When viewing content, such as reading a book, a user may read other users' annotations and comments as threads. Each thread may be tied to the page the original annotation was made on or in the case of a highlight note, to the page the highlighted text resides on. In the case of a book annotation, the annotation can be tied to the cover or essentially "page 0." So if a user is reading a book on page 26, the user will be able to view annotations and comments made by other users in connection with page 26. These can be in chronological order within a page view.

Annotations can preferably also be viewed in an unthreaded manner. This may be accomplished by displaying all annotations for a title in order of the portion of the content to which they relate. For a book, this can be in order of the pages to which they relate though without displaying the page. Thus, the annotations and comments may appear in a long string, rather than grouped on a page-by-page basis.

Annotations may be filtered. Thus, a user may filter the annotations that the user sees for any given title. This may be accomplished by using a filter dialog box. The user may filter annotations based on type (e.g. Book, Page and Highlight). Therefore, if the user only wanted to see page annotations or only wanted to see book annotations the user can accomplish this by filtering. The user may also filter notes based on tags, choosing to see any notes that have been tagged with a specific word. The user may also filter based on a specific collection of notes. So if they only wanted annotations that have been placed in an "English 101" collection that is all they would see. The user may choose to see annotations created only by particular users or groups. Additionally, the user may select only annotations from a specific time frame to display.

Once the user has selected all of their filter criteria, the server 102 will preferably process the entire community's notes through the filter and only display what is left.

As mentioned, users may also access notes outside of the reading experience. Examples include accessing notes via collections, discussions and activity feeds.

Collections: The user may organize his or her notes into collections. For example a student my take all of their biology notes across multiple textbooks and place them into one collection titled "Biology." The user may then access all "Biology" notes by accessing this collection instead of going though each book individually. The user may also permit others, such as his or her friends, to access these notes via the collection. Friends are other users who have agreed to be connected to the user.

Discussions: Once a note is made and then a comment is made on it by another user it may create a discussion. This may reside in a "Discussions" section of the portal and can be accessed outside of the reading experience. The topic of each discussion will be the original note and the discussion will operate in a typical internet forum fashion.

Activity Feed: When a user makes a note or comments on a note, this activity may be displayed in that user's Activity Feed. The Activity Feed is a chronological list of actions the user has taken: made a note, added a book to their library, changed the status of a book, purchased a book, etc. When the user makes a note, this will show in the user's Activity feed along with a link to view the note or comment the user made.

The present invention enables sharing of notes among users, allows users to comment on other user's notes, allows users to make a note based on a specific highlighted portion of text, allows users to display notes within context of a title, allows launching of a note directly into a discussion forum as a topic, allows making a note based on a specific section within an audio or video file, permits making a note on a picture or photo, and provides an ability to refine which user's notes are displayed within the context of a title.

User Interfaces

The following discusses user interfaces in accordance with embodiments of the present invention in the context of e-books. It will be understood that embodiments of the invention can be employed in connection with other forms of content.

There are preferably two primary ways that the notes can be displayed on a user's display screen. These are threaded and unthreaded. In the threaded view, each set of notes are grouped (or "threaded") by page. In the unthreaded view, they are not grouped by page.

FIG. 2 illustrates a screen display for unthreaded notes (in "mini" or minimized view mode) in accordance with an embodiment of the present invention. This display and other displays described herein can be shown as a graphical user interface window on the display screen of a user's device, which can be, for example, a computer, a portable device or a dedicated e-reader. Elements depicted on the display (e.g. button, tabs or links) can be accessed and manipulated with a mouse cursor and/or keyboard and, in some cases, physical touch or gestures made by the user with an appropriately touch capable input interface. A keyboard can also be used for entering text.

As shown in FIG. 2, a first portion of the screen display (also referred to as the "content window") is used for viewing content. In this case, the content is an e-book, text of which is shown on the left side of the display. Elements, such as tabs and buttons, are located in the vicinity of this portion of the display for navigating the content and for performing other functions. As shown in FIG. 2, these elements are located in a tool bar that is positioned directly above the displayed text. Additionally, a first scrollbar is positioned to the right of the text which can be manipulated for scrolling the text. A second portion of the screen display is used for displaying information related to the collaborative annotation of the content. This portion is referred to as the annotations panel and is located on the right side of the display. As shown in FIG. 2, this portion of the screen display of FIG. 2 shows annotations as well as a header containing menu items that are used for performing actions related to the annotations. These items include a "contents" tab, an "annotations" tab, a "search" tab, as well as a "filter" button and an "options" button. The annotations header may be displayed across the top of this portion of the display screen at all times. Additionally, a second scrollbar is positioned on the right side of this portion of the display area which can be manipulated for scrolling the displayed information.

The "annotations" tab can be selected by the user to view the annotations. Selecting the "contents" tab may display a table of contents for a title currently being viewed by the user. Selecting the "search" tab may present a search interface which allows the user to search the current title, such as by keyword.

As also shown in FIG. 2, at the top to the left can be a count of the notes the user can view. This number can be based on any filtering the user has enabled. This number can also show the total number of notes available for this book in the entire user base. So for example, if the book has 12,000 total notes written about it by all members and the user has filtered it down to 105 notes, this figure will say "105 notes (of 12,000)."

The "filter" button launches a filter notes dialog box. The options button opens an options menu. Within the options can be a choice of mini or full view of notes. This choice affects what data the user sees. In the unthreaded view, the notes are associated with a page in the content window. They flow from the oldest to the newest post down the screen. In an embodiment, a batch of notes (e.g. each batch can include 25 notes) can be accessed at a time, with the ability to access additional batches of notes (e.g. in batches of 25 at a time). The scroll bar allows the user to scroll within the current batch of notes. On the left side of each note can be the page number in the book that the note is tied to, or other relevant meta-data.

In mini view, highlighted text (if applicable) that the note is tied to can be displayed in a first line or two of text at the top of the note. If there is a note tied to the highlight, the highlighted text can be truncated to one line. If there is no note tied to the highlight (i.e. just a highlight) then the text can be truncated to two lines of text. If the note is a page note (and not associated with any text) there may be no highlighted text displayed here. This text may also be highlighted in the same color as the text in the content window.

The note itself can start at a next line of text. This can be under the highlighted text (if applicable). If there is highlighted text, the note text can be truncated to one line. If there is no highlight associated with the note (i.e. a page note) the note can be truncated to two lines of text. The username of the person who left the note can be at the bottom left of the note. This can include a link that launches a browser which then links to the Portal and open's a window showing this person's profile.

A timestamp preferably shows the date and time that the note was made. Preferably, this is displayed by time elapsed since the note was made. This can be in the following format: (1) if less than an hour, then the number of minutes elapsed are displayed; (2) if over an hour, and up to 23 hours and 30 minutes, then the number of hours elapsed is displayed; (3) if over 23 hours, 35 minutes and less than two days, then the term "yesterday" is displayed; and (4) if more than two days, the date is displayed (e.g. Mar. 10, 2010).

If the user has a "hide spoilers" option enabled and the note has been tagged by its creator as a "spoiler," then the note will preferably carry a "spoiler alert" badge and the text will not display. In order to read the note the user will have to expand the view of the note. A carrot on the right side of the spoiler alert badge can be used to expand the note into a note details view (see FIGS. 8 and 9). A spoiler is a note that reveals information about the title which tends to reveal the outcome of a dramatic episode within the title, or the conclusion of the title. Because revealing such plot elements can "spoil" enjoyment of the title for users that are not already familiar with its plot, those users may want to avoid notes that are identified as spoilers.

A "click to load more" button can be used to send a request for the next batch of 25 notes based on the user's filter criteria. If there are less than 25, all can be sent. If more, then the next 25 that best match the filter can be sent.

Figure 3:
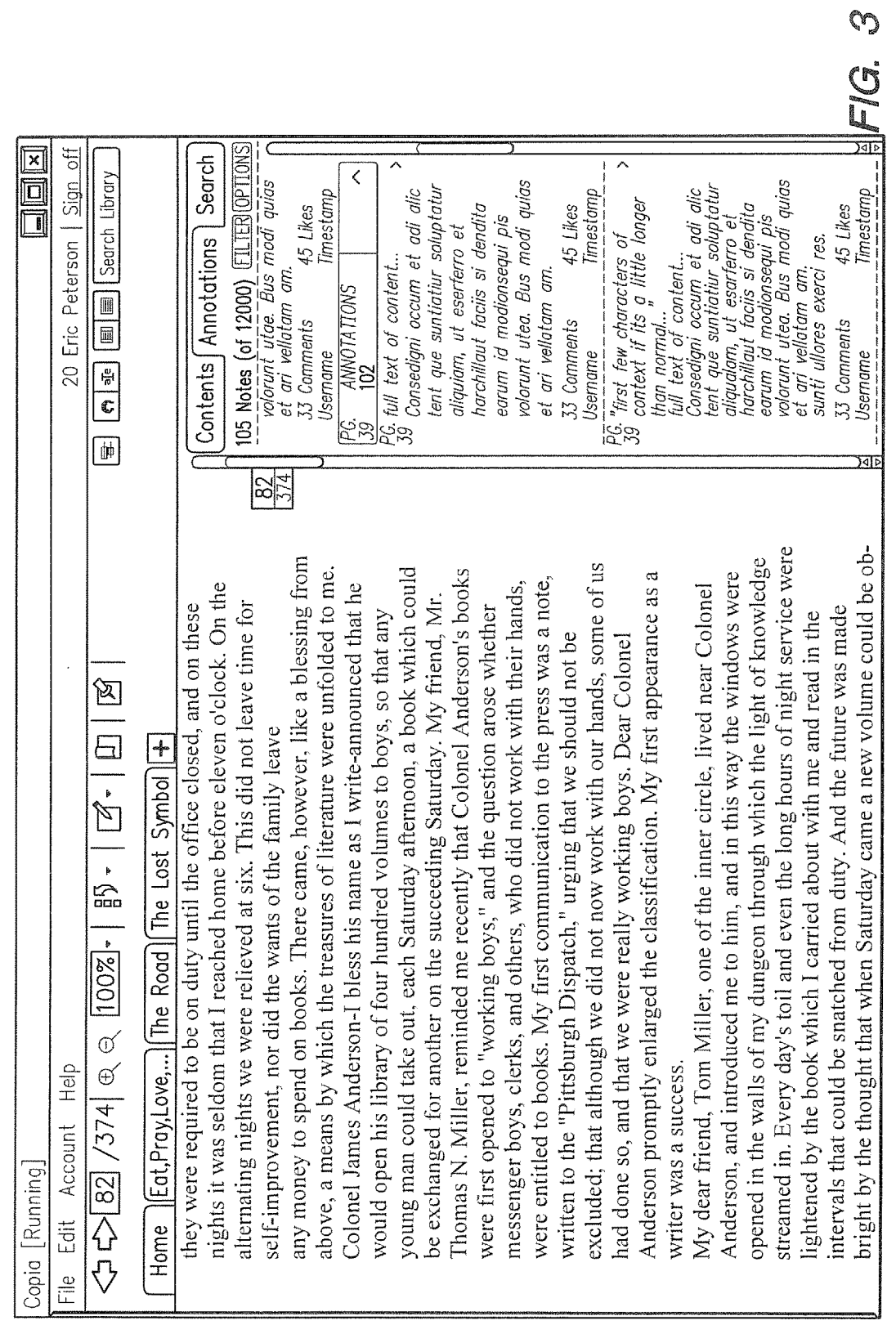

FIG. 3 illustrates a screen display for unthreaded notes (in "full" view mode) in accordance with an embodiment of the present invention. This view differs from the unthreaded mini view shown in FIG. 2 in that the full text of the note is preferably visible. Additionally, a count of the number of comments and "likes" may be displayed at the bottom of each note. Similarly, a batch of notes (e.g. 25 notes per batch) can be accessed at a time, with the ability to access additional notes, in batches. The scroll bar allows the user to scroll within the current batch of notes. On the left side of each note can be the page number that the note is tied to.

In this full view, the highlighted text (if applicable) that the note is tied to can be displayed in a first line or two of text at the top of the note. The highlighted text can be truncated to two lines in full view. This text can also be highlighted in the same color as the text in the content window.

The note itself can start at a next line of text. This can be under the highlighted text (if applicable). The entire note can be displayed when in full view. Near the bottom of the note the number of comments associated to the original note and the number of people who have clicked "like" for the note can be displayed. The username of the person who left the note can also be at displayed the bottom left of the note. This can include a link that launches a browser which then links to the Portal and open's a window showing this person's profile.

A timestamp will preferably show the date and time that the note was made. As described above, this is preferably displayed by time elapsed since the note was made. Additionally, if the user has the "hide spoilers" option enabled and the note has been tagged by its creator as a "spoiler" then the note will preferably carry a "spoiler alert" badge and the text will not display. In order to read the note, the user will have to expand the view of the note. A carrot on the right side of the spoiler alert badge can be used to expand the note into a note details view A "click to load more" button preferably sends a request for the next batch of 25 notes based on the user's filter criteria. If there are less than 25, all can be sent. If more, then the next 25 that best match the filter can be sent.

FIG. 4 illustrates a screen display for threaded notes (in "mini" view mode) in accordance with an embodiment of the present invention. In this view, the notes are each tied to a page header. They are preferably displayed in order of oldest to newest for each page. The displayed notes can be any notes available through an entire user community based on the filters the user has set. This count can be shown in the header for the page the user is currently on, the previous page and the next page. All other pages can show the icon to let the user know they will load when they get to that area.

Preferably, a batch of notes (e.g. 25 notes per batch) can be accessed at a time, with the ability to access additional notes, in batches. The scroll bar allows the user to scroll within the current batch of notes. Each page of content may have its own note header. On the left side of the header can be the page number. The number of annotations associated with that page (after applying the filter criteria) can be also displayed in the header. This can be altered to reflect the previous page, current page and next page. Alternatively, a count of the individual user's notes for each page in the book can be displayed on the left side of the header.

The header itself can include a graphic element such as a shaded bar graph which indicates the number of annotations tied to that page. Whichever page in the book has the most notes can be considered the "100%" graph, then each lesser page can be a percentage of that. For example, if the page with the most notes has 100 notes, then 100 becomes the denominator. If another page has 25 notes, its graph should show 25% across.

To the right is a carrot which can be used to either contract or expand the list. When the list is contracted the carrot faces pointing to the right, and only the header is displayed for that page. When the carrot is clicked, the list expands to show notes for that page. When the list is expanded, the carrot is preferably pointing down, and when the carrot is clicked the list contracts.

Also in this view, the user preferably sees the highlighted text (if applicable) that the note is tied to. This highlighted text can be displayed at the top of the note. If there is a note tied to the highlight, the highlighted text can be truncated to one line. If there is no note tied to the highlight (i.e. it is just a highlight) then the text can be truncated to two lines of text. If the note is a page note (and not associated with any text) there may be no highlighted text displayed here. This text can also be highlighted in the same color as the text in the content window.

The note itself can begin at the next line of text. This can be under the highlighted text (if applicable). If there is highlighted text, the note text can be truncated to one line. If there is no highlight associated with the note (i.e. a page note) the note can be truncated to two lines of text. The username of the person who left the note can be at the bottom left of the note which can be a link to this person's profile. A timestamp preferably shows the date and time that the note was made. As described above, the timestamp preferably shows elapsed time since the note was made.

If the user has the "hide spoilers" option enabled and the note has been tagged by its creator as a "spoiler" then the note may carry a "spoiler alert badge and the text will not display unless the user expands the of the note view. The carrot on the right side of the note can expand into the note details view.

A click to load more button preferably sends a request for the next batch of 25 notes based on the user's filter criteria. If there are less than 25 all notes can be sent. If more, then the next 25 that best match can be sent.

Figure 5:
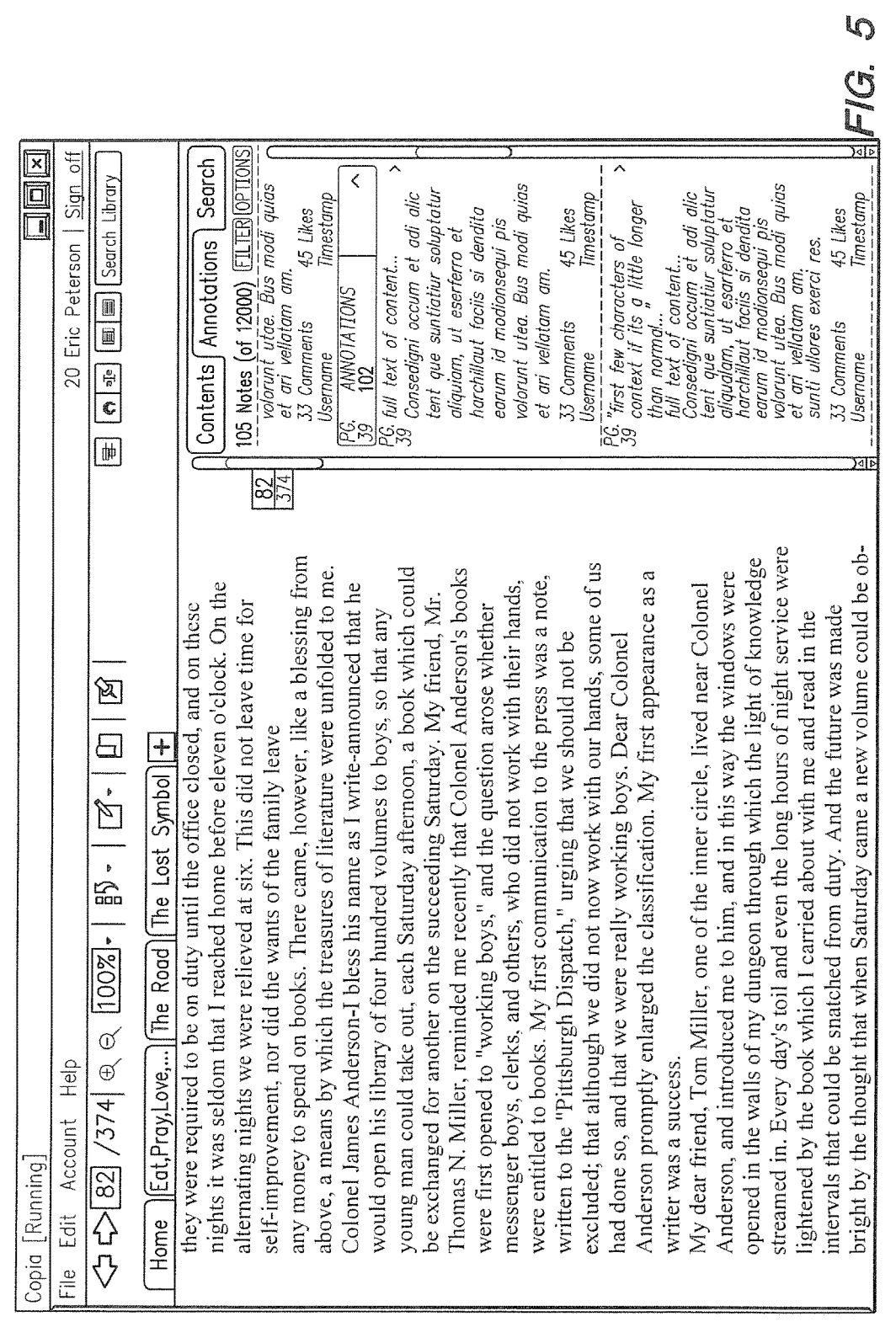

FIG. 5 illustrates a screen display for threaded notes (in "full" view) in accordance with an embodiment of the present invention. Similarly to FIG. 4, in this view, the notes are each tied to a page header and are preferably in order of oldest to newest for each page. The threaded full view appears similar to the unthreaded full view shown in FIG. 2 with the addition of a page number header bar which when activated by the user collapses the notes for that page. The threaded full view differs from the unthreaded full view shown in FIG. 4 in that the full text of the note is preferably visible. Additionally, a count of the number of comments and "likes" may be displayed at the bottom of each note.

Preferably, a batch of notes (e.g. 25 notes per batch) can be accessed at a time, with the ability to access additional notes, in batches of 25 at a time. The scroll bar allows the user to scroll within the current batch of notes. Each page of content may have its own note header. On the left side of the header can be the page number. The number of annotations associated with that page (after applying the filter criteria) can be also displayed in the header. This can be altered to reflect the previous page, current page and next page. Alternatively, a count of the individual user's notes for each page in the book can be displayed on the left side of the header.

The header itself can include a graphic element such as a shaded bar graph which indicates the number of annotations tied to that page. Whichever page in the book has the most notes can be considered the "100%" graph, then each lesser page can be a percentage of that. For example, if the page with the most notes has 100 notes, then 100 becomes the denominator. If another page has 25 notes, its graph should show 25% across.

To the right is a carrot which can be used to either contract or expand the list. When the list is contracted the carrot faces pointing to the right, and only the header is displayed for that page. When the carrot is clicked, the list expands to show notes for that page. When the list is expanded, the carrot is preferably pointing down, and when the carrot is clicked the list contracts.

In this full view, the highlighted text (if applicable) that the note is tied to can be displayed in a first line or two of text at the top of the note. The highlighted text can be truncated to two lines in full view. This text can also be highlighted in the same color as the text in the content window.

The note itself can start at a next line of text. This can be under the highlighted text (if applicable). The entire note can be displayed when in full view. Near the bottom of the note the number of comments associated to the original note and the number of people who have clicked "like" for the note can be displayed. The username of the person who left the note can also be at displayed the bottom left of the note. This can include a link that launches a browser which then links to the Portal and open's a window showing this person's profile.

A timestamp will preferably show the date and time that the note was made. As described above, this is preferably displayed by time elapsed since the note was made. Additionally, if the user has the "hide spoilers" option enabled and the note has been tagged by its creator as a "spoiler" then the note will preferably carry a "spoiler alert" badge and the text will not display. In order to read the note, the user will have to expand the view of the note. A carrot on the right side of the spoiler alert badge can be used to expand the note into a note details view A "click to load more" button preferably sends a request for the next batch of 25 notes based on the user's filter criteria. If there are less than 25, all can be sent. If more, then the next 25 that best match can be sent.

Options Menu

Figure 6:
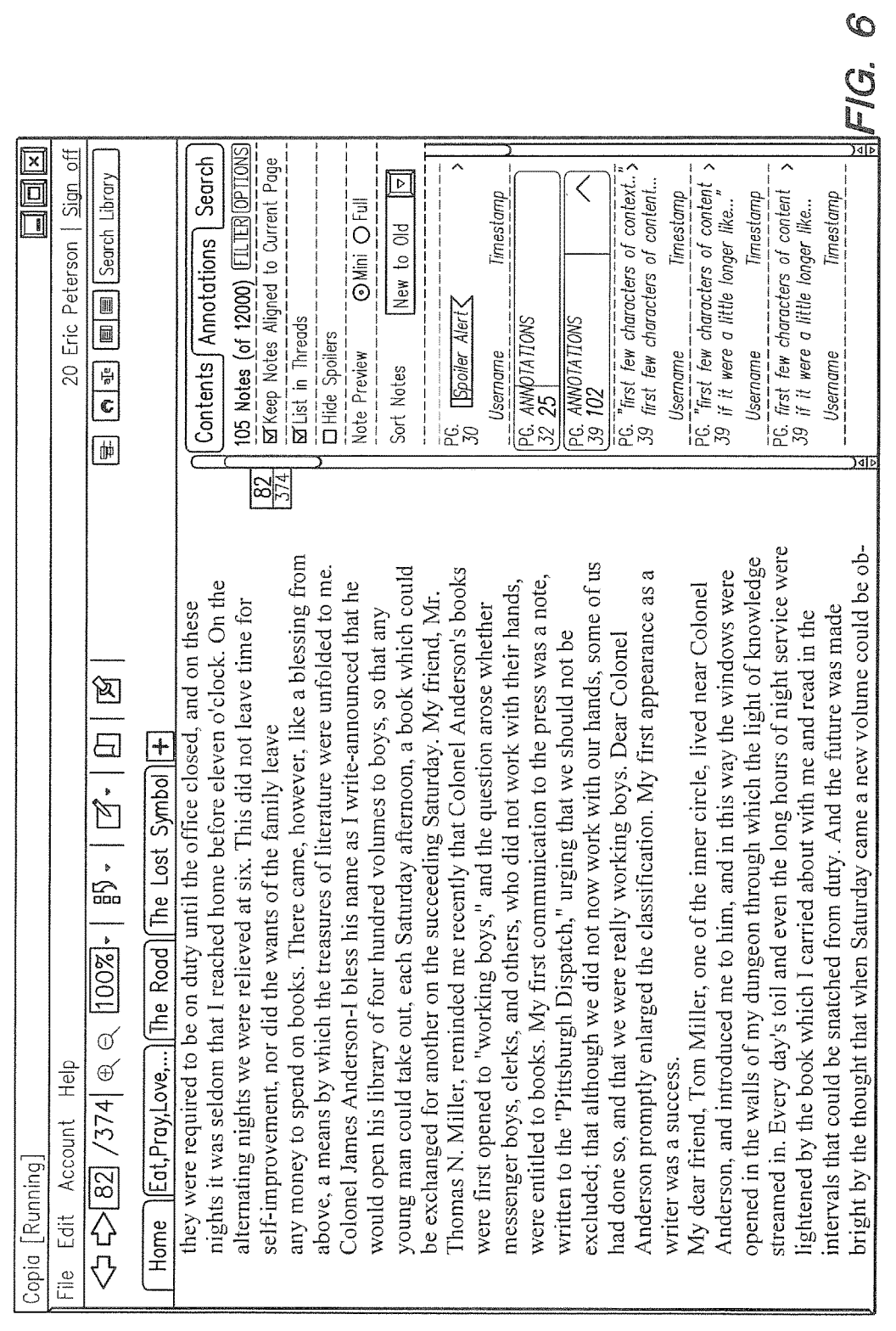

FIG. 6 illustrates a screen display for an options menu in accordance with an embodiment of the present invention. As mentioned above, the right side portion of the screen display, which is used for displaying information related to the collaborative annotation, includes an options button. When activated, this button opens an options menu. To close these options, the user clicks the options button again.

The option menu can include a checkbox for alignment which can be labeled, for example, "keep notes aligned to current page." When the user has been scrolling through the notes in the right panel they can be off from the current page that is displayed in the content window. If the user clicks this checkbox, the notes can be aligned back to the current page (the page that is currently shown in the left panel). Preferably, while this box is checked, the user cannot move past the current page's notes. The scroll will stop at the last note for the current page. The default for this box is preferably unchecked. Alternatively, rather than a checkbox, this can be a default setting.

A "list in threads" checkbox can control the display of the threaded/non-threaded views. When checked, the user may see the threaded view (as in FIGS. 4 and 5). When unchecked, the user may see the unthreaded view (as in FIGS. 1 and 2). The default for this checkbox is preferably checked.

Figure 7:
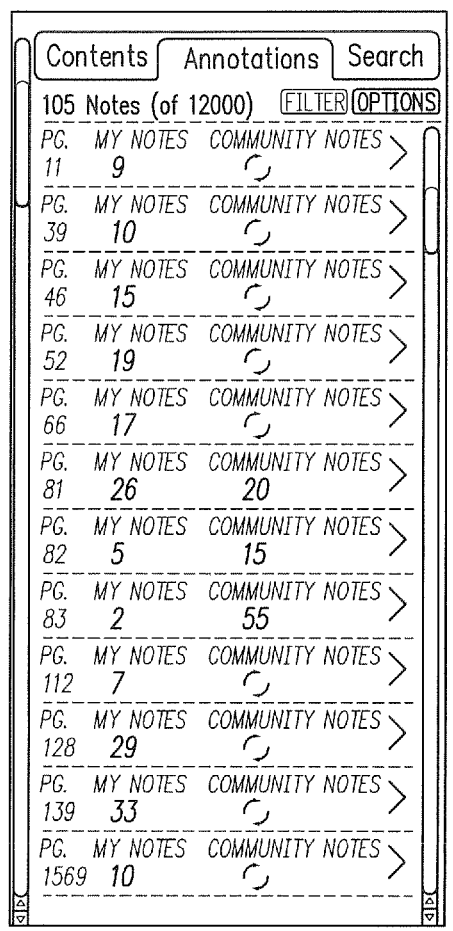
FIG. 7 illustrates a screen display when collapse all is selected in accordance with an embodiment of the present invention.

Clicking "collapse all" preferably pulls all notes back into their page header in threaded view, thus, only the headers for each page would be shown. This functionality is preferably only available when the "list in threads" checkbox is checked. FIG. 7 illustrates a screen display when collapse all is selected in accordance with an embodiment of the present invention.

Clicking "expand all" pushes out all notes in threaded view, thus, all notes can be displayed. This functionality is preferably only available when the "list in threads" checkbox is checked.

A "hide spoilers" checkbox can control display of spoiler alerts. If this box is checked, any notes that have been marked as spoilers will preferably display the spoiler alert badge instead of text. Default value for this box is preferably checked.

"Note preview" radio buttons let the user select whether to display the notes mini view (as in FIGS. 1 and 4) or in full view (as in FIGS. 2 and 5). The default for this is preferably mini view.

A "sort notes" drop down menu allows the user to select an ordering used to sort the notes. For example, the user can sort by: newest to oldest; oldest to newest; most likes to least likes; or most commented on to least commented on. If the user is in threaded view, the notes are sorted in this manner by page. If the user is in unthreaded view, all notes for the book are sorted in this manner as a group.

Note Details

When the user clicks the carrot for a note, the user will see a note details view. This provides a more in-depth look at the note, including display of the creator of the note as well as meta data for the note. FIG. 8 illustrates a view of note details in accordance with an embodiment of the present invention. FIG. 8 shows that the comments are displayed separately from the note details and that the comments are accessed by a "comments" tab. The user can return to the note details using a "note details" tab.

Figure 9:
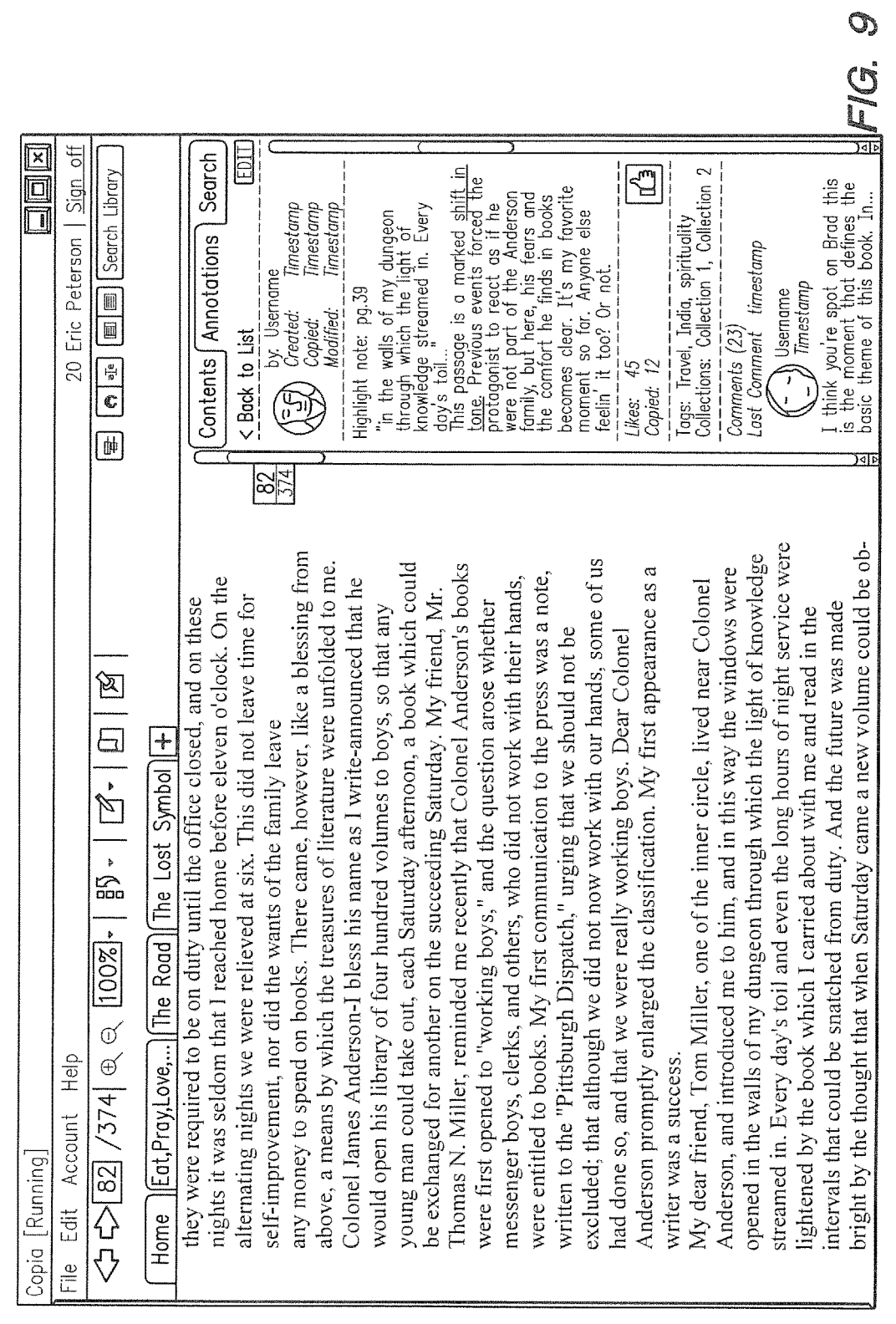

FIG. 9 illustrates a view of note details in accordance with an alternative embodiment of the present invention. As shown in FIG. 9, the comments are shown together with the note details. In this case, the "note details" and "comments" tabs can be omitted. As shown in FIGS. 8 and 9, the user avatar and user information are displayed above the note. Alternatively, the user avatar and user information may be displayed below the note.

Figure 10:
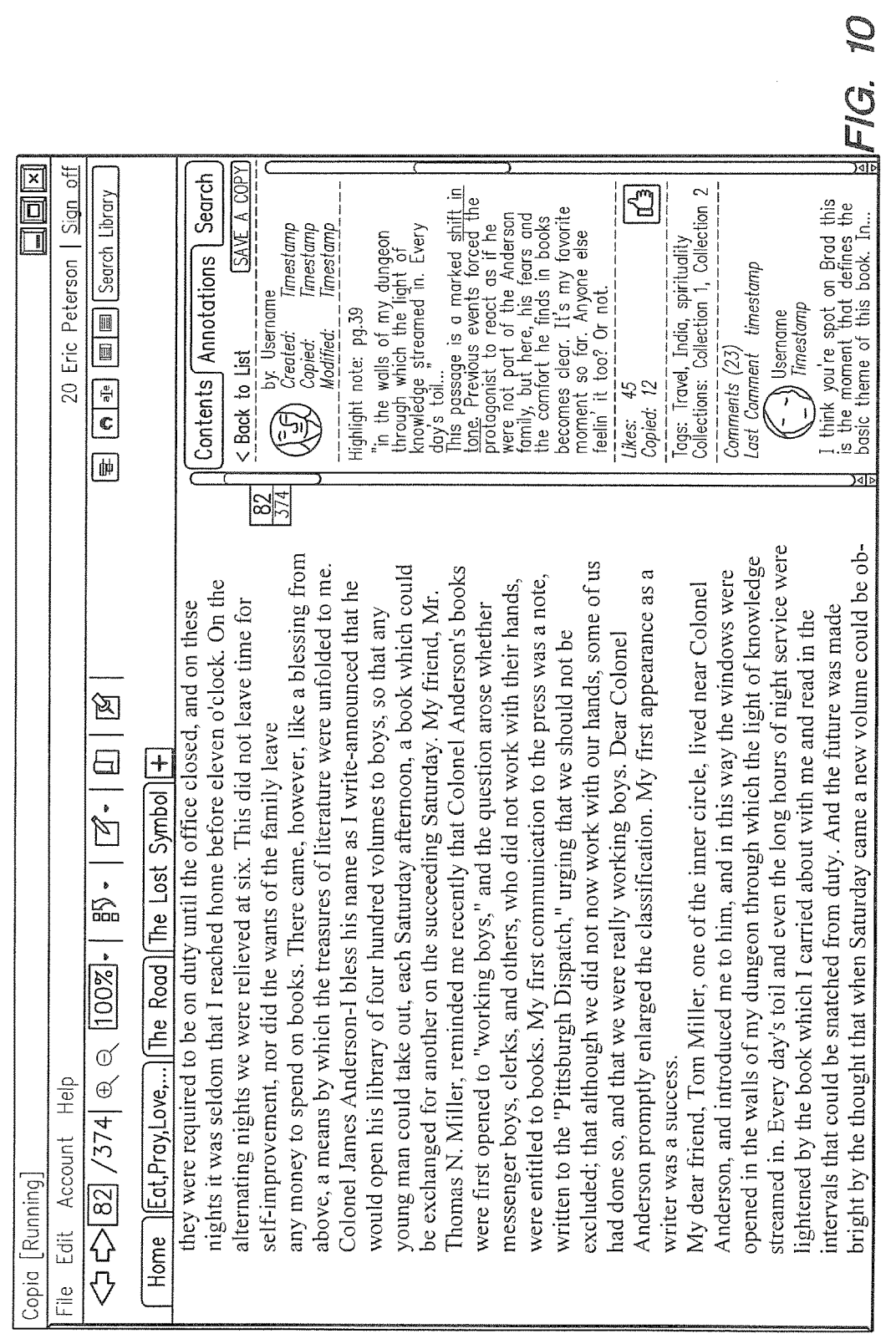

A "save a copy" button can be included in the header of the note details view. When the user clicks this, a copy of the current note can be saved to that user's notebook. The notebook is preferably a storage area at the server 102 that is assigned that particular user. FIG. 10 shows a screen display for the save a copy feature in accordance with an embodiment of the present invention. A dialog box appears for this functionality. Preferably, only the text of the note itself can be saved, not its meta-data. The copied note text can be editable by the user who has copied it. If the user has already saved this note this button is preferably grayed out.

If the user is the author of the note, an edit button will preferably appear instead of the "save a copy" button (as in FIG. 9). This launches an edit notes dialog box.

Figure 11:
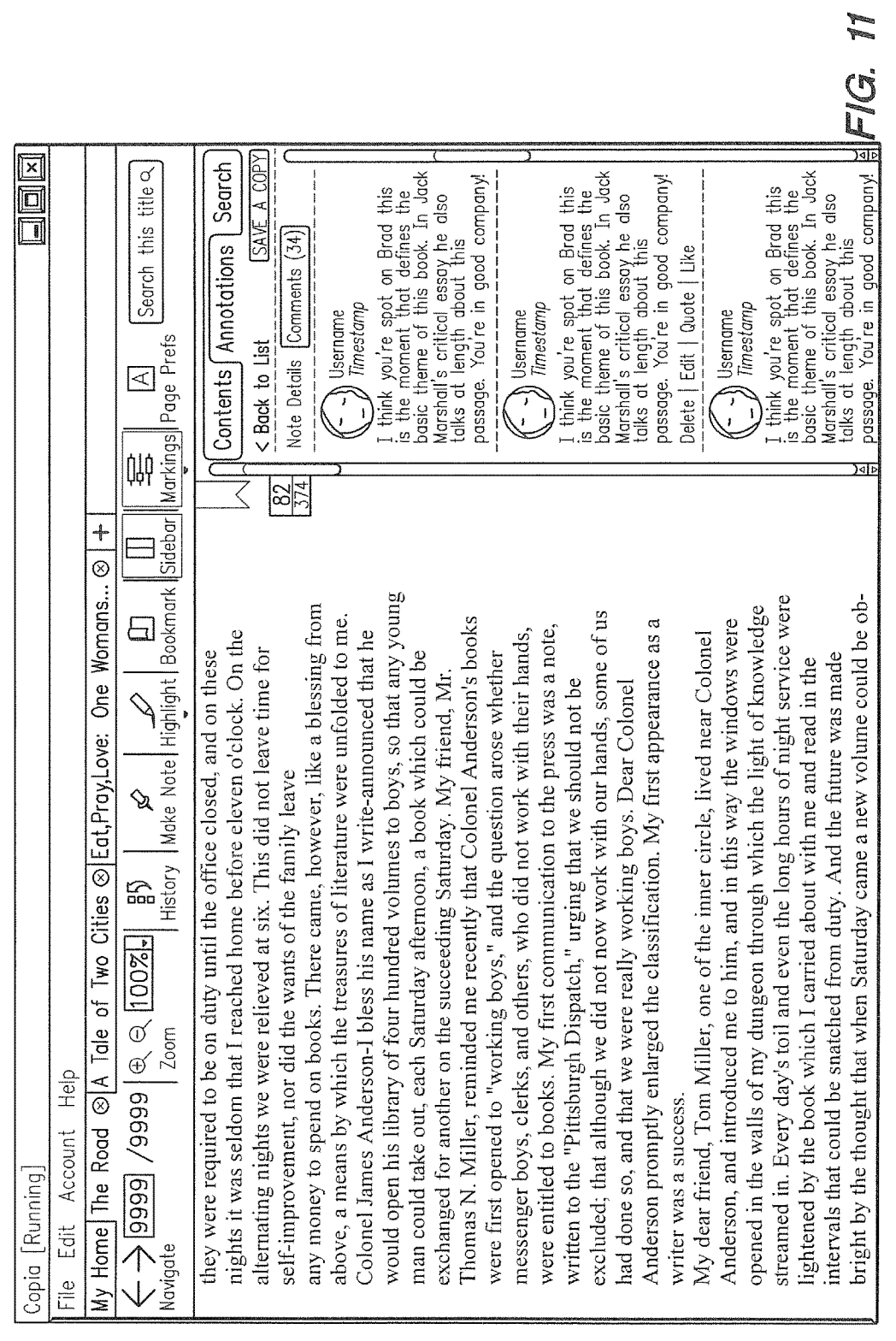

At the top of the note is a tab to toggle between the note details and comments on the note. When the user clicks note details the user can be shown the note itself and any associated details but not any comments on the note. Activating the comments link causes the note details to be replaced with any comments on the note. A total of the number of comments for the note is preferably displayed in parenthesis next to the comments link. FIG. 11 illustrates a screen display for comments on a note in accordance with an embodiment of the present invention. FIG. 11 shows the display when the user selects the "comments" tab shown in FIG. 9. The user can return to the note details (FIG. 8) using the "note details" tab.

Referring to FIG. 9, the note type (e.g. a highlight note) as well as the page number the note is associated with can be displayed near the top of each note. If the note is a highlight note, the highlighted text is preferably also displayed, which may be truncated to the lines of text. This text will preferably also be highlighted in the same color as the text in the content window.

The text of the note itself preferably appears below any highlighted text. This text will preferably not be truncated and the entire note can be displayed, allowing the user to scroll through the right panel as necessary.

The avatar of the note's author will preferably be displayed with the note text. The username of the author is preferably displayed next to the avatar. The username can be clickable and will link directly to that user's profile in the portal. A timestamp for when the note was created can be displayed along with the username. As described above, the timestamp preferably shows elapsed time since the note was made.

If the note has been copied or if the author has modified the note, the most recent instance of it having been copied or modified can be displayed. A timestamp may show elapsed time since it was copied or modified by the author.

At the bottom of the note the number of people who have clicked "like" for the note can be displayed. Below the number of likes can be the number of people who have copied this note into their notebook.

The user may click a "like" button to show approval of a note. As shown in FIG. 9, the like button can include a graphic symbol, such as a hand with its thumb pointing up. Clicking on the like button will add a count to the like count for this note (the like count for a title is the total number of users that have indicated their affinity for the note). The user can only click the button one time for any note. Once the button has been pressed by a particular user, it preferably becomes inactive for that user so that it cannot be pressed again.

Tags related to the note can be displayed below the note. These are preferably truncated to one line of text. If the user expands the right panel out, more data can be displayed, but preferably still limited to one line. In an embodiment, the user can view all of the tags related to a note. Additionally, if the user clicks on a tag, details of the tag are then shown.

Collections the note resides in can be displayed below the tags. These are also preferably truncated to one line of text. If the user expands the right panel out, more data can be displayed, but preferably still limited to one line. In an embodiment, the user can view all of the collections related to a note. If a user clicks on a collection name, the user is preferably shown that collection in the portal.

Below the collections can be any comments to the note. A header for the comments can be shown that includes the number of comments (shown in FIG. 9 in parenthesis). A timestamp of the most recent comment can be displayed.

The comments can be listed in sequential order from oldest to newest. The avatar of the user who left the comment can be displayed. The username of the person who left the comment can be displayed next to the avatar. This username can be hyperlinked to that person's profile page in the portal. The timestamp of the comment can also be displayed. The text of the comment can be displayed under the avatar and username. The text of the comment is preferably not be truncated.

Creating a Note

A user can preferably create different types of notes. These can include a general note, a book note, a page note and a highlight note. A note is created by accessing a dialog box. The dialog box will preferably pop up if the user pushes the "make a note" button on the tool bar or if the user right clicks on the content and chooses "make a note."

FIG. 12 illustrates a screen display for creating a general note in accordance with an embodiment of the present invention. Global elements are preferably displayed across all note creation screens and include a left sidebar including tabs for each note type, privacy options, navigation tabs, a cancel selection and a save selection.

The left sidebar shows the user what type of note they are currently creating by shading of the tabs. As shown in FIG. 12, the general note tab is shaded differently from the others. The method by which they launch the dialog box determines the default appearance of this left sidebar. If the user wants to switch the note type, the user can select a different tab. For example, if the user highlights a passage and clicks the note button, the dialog box will open and default to the highlight note screen. The user could then click page note. In this case, the highlighted text would be lost and the user would go into the page note process.

Privacy selections can be made by accessing a dropdown list that allows the user to select the privacy level of the note they are creating. For example, the choices can include everyone, just me, my friends, or my followers. Additionally, the user may be given the option of making a privacy selection for the entire title via a different menu. In this case, if the privacy setting for a book has been set to "just me" then the user may not have the option to set the note to anything but that setting. If the book has been set to "my friends" the user may set the privacy for the note as "my friends" or "just me." If the book has been set to "my groups" the user may set the privacy for the note as "my groups or "just me." If the book has been set to "everyone" the user can set the privacy for the note at any option.

The navigation tabs across the top of the create a note dialog box allow the user to navigate through the note itself, tags, collections, and book information.

The cancel button preferably cancels the note creation, closes the dialog box and does not save any of the information. The save button preferably closes the dialog box and saves any data the user has input.

A general note is a note that is not associated with any text or any book. It is solely associated to the user. A user may launch this note type by clicking the create note button with no text highlighted, then clicking general note or by right clicking in the screen with no text highlighted, then clicking general note.

A general note can include a title field and a note field. The title field may accept alphanumeric and special characters and have a preselected maximum number of characters (e.g. 50 characters). The note field can be a free form text field supporting alpha numeric and special characters. This may also have a preselected maximum number of characters (e.g. 500 characters). When the user reaches the maximum number of characters, the box preferably does not display any further data so the user knows when the limit has been reached.

A book note is a note that is associated only with a book. It is not associated with a specific page or line of text. Book note may be the default note input view if the user has not selected text. A user may launch this note type by clicking the create note button with no text highlighted, or by right clicking on a non-highlighted section of text and selecting create a note.

FIG. 13 illustrates a screen display showing book notes in accordance with an embodiment of the present invention. The book notes are preferably displayed at the beginning of all other notes. Thus, the book notes are effectively associated with page zero, but rather than display the page number, the term "Booknotes" is preferably displayed. FIG. 14 illustrates a screen display showing book notes in accordance with an alternative embodiment of the present invention. FIG. 14 differs from FIG. 13 in that FIG. 14 shows that the number of user's notes and the number of overall community notes are separately displayed, whereas, in FIG. 13, the user's notes and the community notes are displayed in one lump sum of notes.

Figure 15:
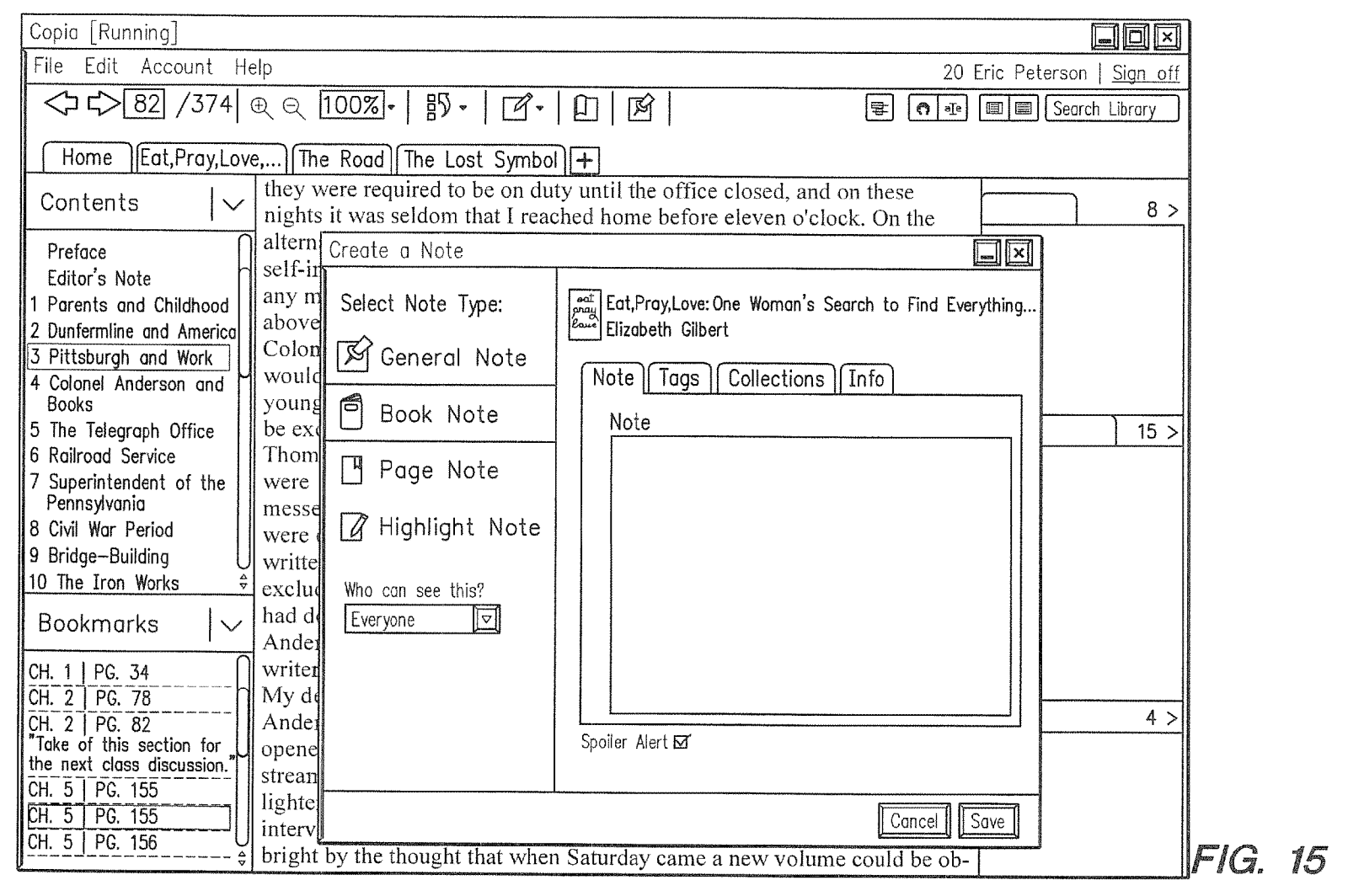

FIG. 15 illustrates a screen display for creating a book note in accordance with an embodiment of the present invention. Since the book note is associated with a book, an image of the book cover, the title and the author's name is preferably displayed at the top of the book note dialog box.

A note field for the book note can be a free form text field supporting alpha numeric and special characters. This may also have a preselected maximum number of characters (e.g. 500 characters). When the user reaches the maximum number of characters, the box preferably does not display any further data so the user knows when the limit has been reached.

At the bottom of the note tab can be a checkbox for a spoiler alert. This can be checked to identify the note as a spoiler. As such it can be used for filtering notes based on spoilers. The default value is preferably unchecked.

Figure 16:
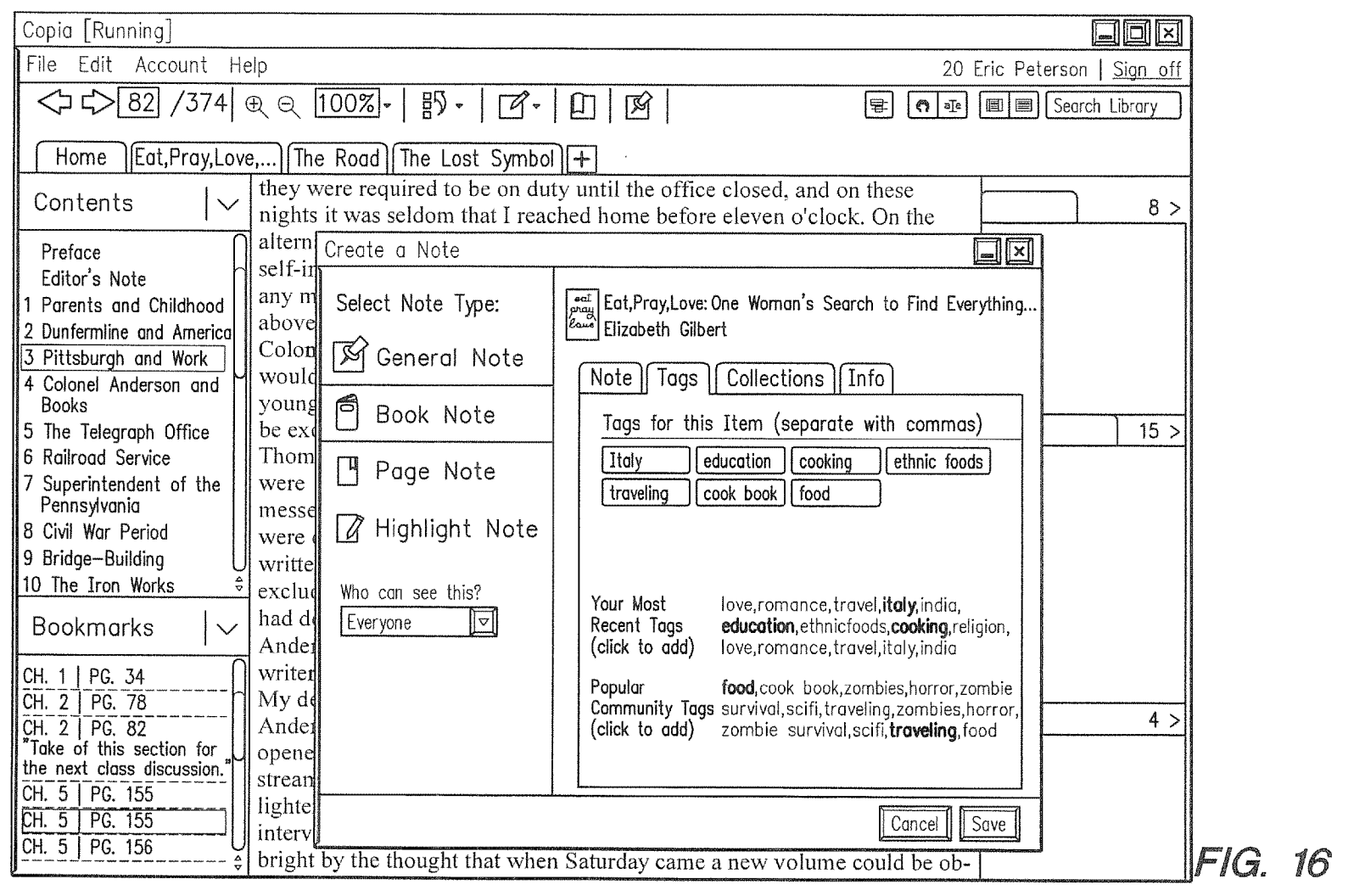

FIG. 16 illustrates a display screen for entering and viewing tags for a book note in accordance with an embodiment of the present invention. The tags field allows the user to type in a tag or multiple tags (e.g. using commas to separate them).

Below the tags field may be a "your most recent tags" list. This list may be truncated to three lines and may include the most recently used tags by this user for this book. They can be in order from most to least recently used. When the user clicks a tag it can be displayed in the tags field above. If the user clicks the "X" next to the tag in the field it can be removed.

Below the "your most recent tags" may be a "popular community tags" list. This list may be truncated to three lines and may include the most commonly used tags for this book by the overall community. They can be in order from most to least used. When the user clicks a tag it can be displayed in the tags field above. If the user clicks the "X" next to the tag in the field it can be removed.

Figure 17:
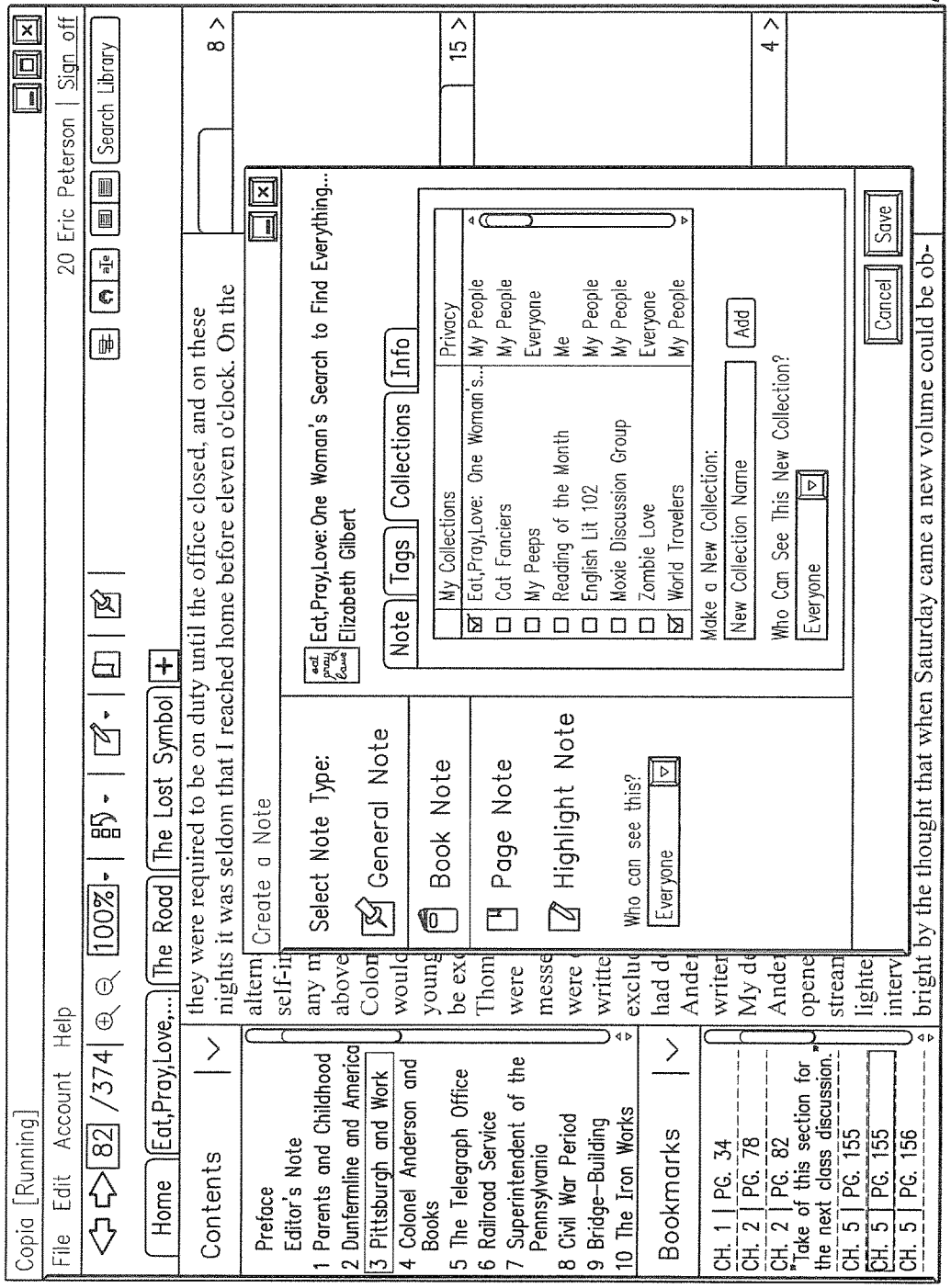
FIG. 17 illustrates a collections tab for a book note in accordance with an embodiment of the present invention.

FIG. 17 illustrates a collections tab for a book note in accordance with an embodiment of the present invention. A "my collections list" field displays a list of note collections this user has created along with that collection's privacy setting. The user can then click the checkbox to the left for any collections they would like the note added to. If they would like to add it to all collections they can click the checkbox at the top. These checkboxes preferably all default to unchecked.

A "make a new collection" text box may be provided which allows the user to input a name for a new collection and then click "add." This will create a new notes collection. This new note collection will then be added into the list above. This field may check the input name against the current list of note collections, and, if it already exists, it can inform the user and ask the user to select a different name.

A privacy selection allows the user to select who can view the newly-created collection. The privacy selections can include everyone, just me, my friends, or my followers. This may default to everyone.

Figure 18:
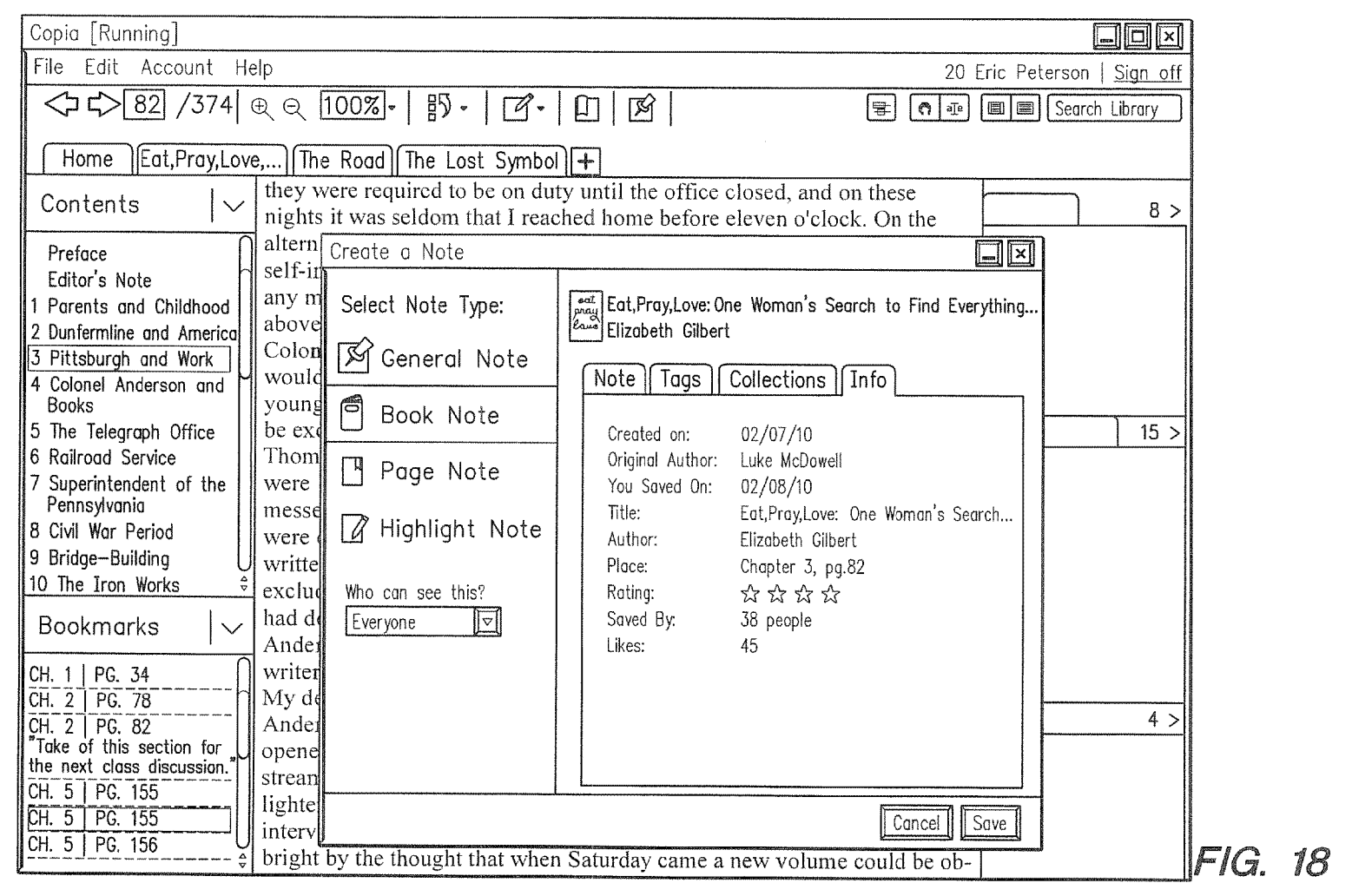

The "Info" tab displays information about the book note, preferably in a non-editable display. FIG. 18 illustrates a screen display of book information in accordance with an embodiment of the present invention. The following fields are preferably included: created on date; author of the note; date user saved; book title; author of the book; placement of note; book rating; number of people who have saved the note; number of likes note has received.

A Page Note is a note that is associated to specific page in a book. It is not associated to a specific line of text. A user launches this note type by: clicking the create note button with no text highlighted, then selecting Page Note in the Create Note screen; or by right clicking on a non highlighted section of text and selecting Create A Note, then selecting Page Note in the Create Note screen.

Figure 19:
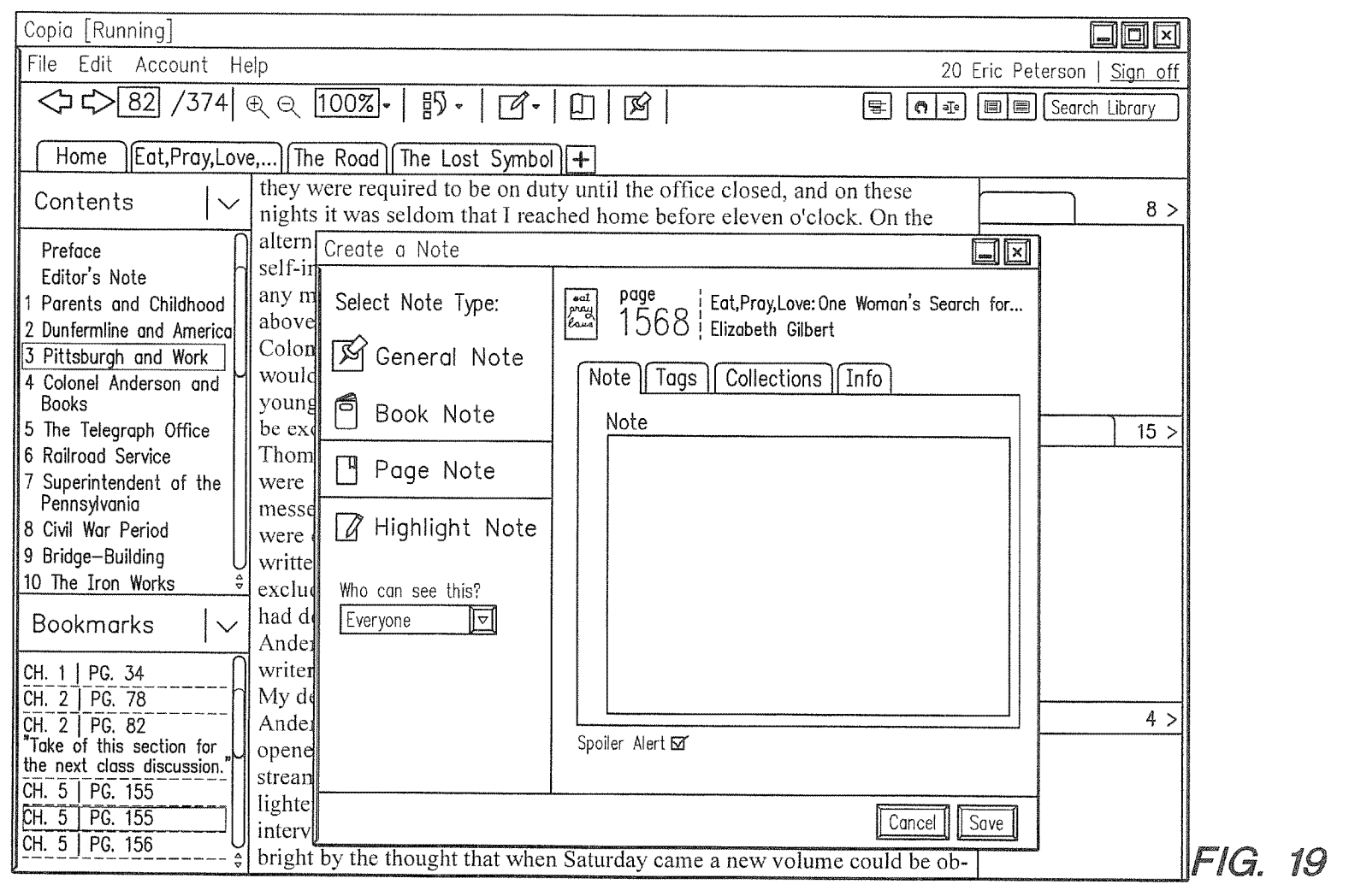

FIG. 19 illustrates a screen display for creating a page note in accordance with an embodiment of the present invention. This is done using the page note tab.

A header displayed across the top of the page note input screen can include an image of the book, the page number the user is on, the title of the book and the author of the book. The displayed page number is the page of the book that the page note will be associated with.

The note tab for a page note can include a note field and a spoiler alert checkbox. The note field can be a free form text field supporting alpha numeric and special characters. This may have a 500 character maximum. When the user reaches 500 characters the box may stop displaying any further data so the user knows they have reached their limit. At the bottom of the Note tab can be a checkbox for Spoiler Alert. This can be used for filtering notes based on spoilers. The default value may be unchecked.

Similarly to the book note, the page note display can include a tags field, which allows the user to enter tags for the page note, and which may also display the "your most recent tags" list as well as the "popular community tags" list. Also, a collections tab of the page note can include the "my collections list" and the "make a new collection" options, including an ability to select a privacy option for the new collection.

The "Info" tab displays information about the page note, preferably in a non-editable display. The fields may include: created on date; author of the note; date user saved; book title; author of the book; placement of note (i.e. its page); book rating; number of people who have saved the note; and number of likes note has received.

Figure 20:
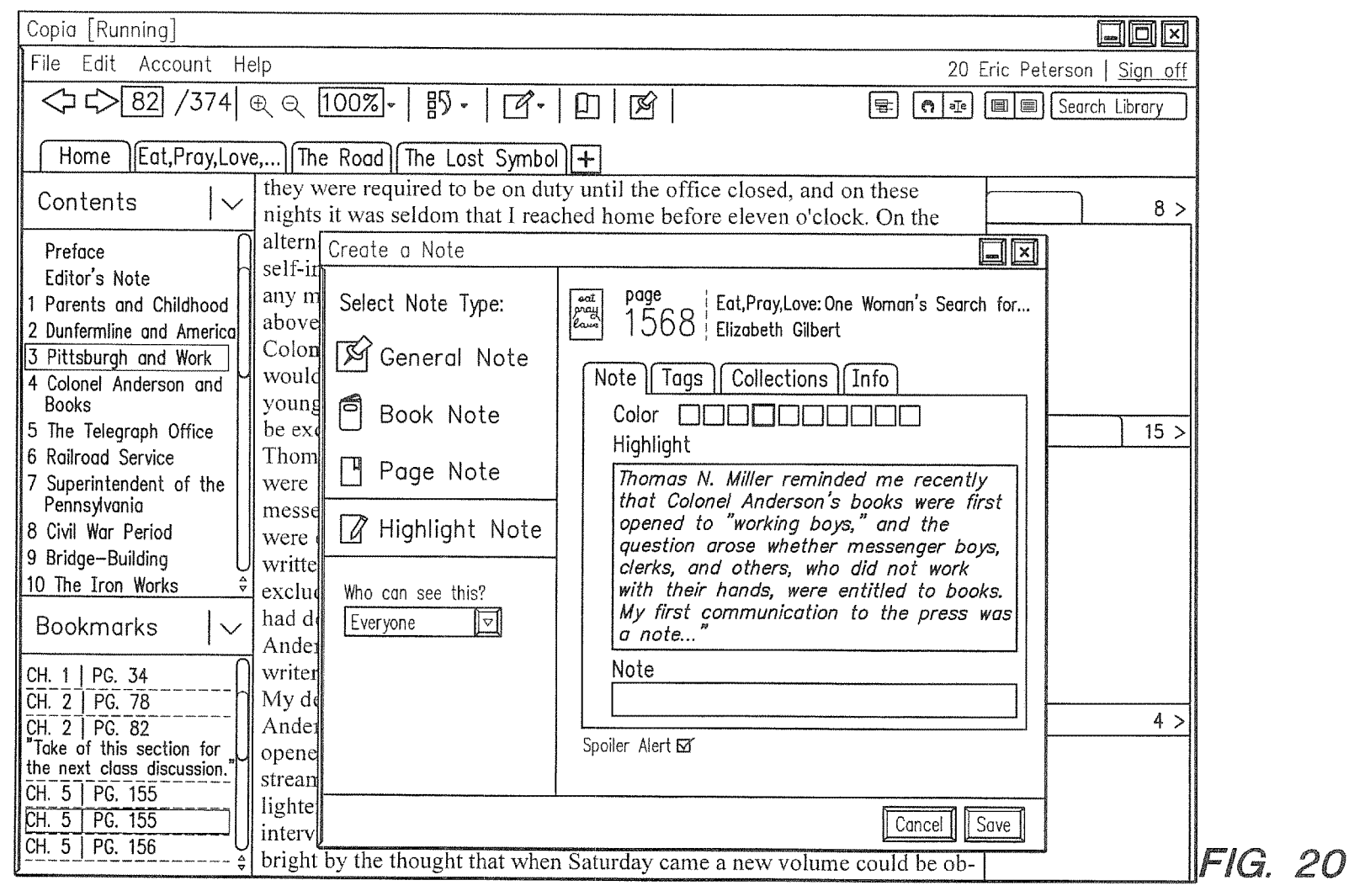

A highlight Note is a note that is associated to specific section of text in a book. A user can launch this note type by highlighting a section of text, then clicking the create note button or by highlighting a section of text, then right clicking and choosing create note. FIG. 20 illustrates a screen display for a creating highlight note in accordance with an embodiment of the present invention. This screen may be accessed using the highlight note tab.

Similarly to the page note, a header displayed across the top of the highlight note input screen can include an image of the book, the page number the user is on, the title of the book and the author of the book.

The note tab for a highlight note can include a color selection, a highlighted text field, a note field and a spoiler alert checkbox. The user may have a choice of several colors to choose for the highlighted text. Whichever is clicked can be displayed larger and outlined to show it is currently the choice. The text that the user previously highlighted can be displayed in the highlighted text field. This text is not editable and is for display only. There is preferably a preselected maximum number of characters for the note text (e.g. this can be 3,500 characters). The note field can be a free form text field supporting alpha numeric and special characters. This may have a 500 character maximum. When the user reaches 500 characters the box may stop displaying any further data so the user knows they have reached their limit. At the bottom of the Note tab can be a checkbox for Spoiler Alert. This can be used for filtering notes based on spoilers. The default value may be unchecked.

Also, similarly to the page note and book note, the highlight note display can include a tags field, which allows the user to enter tags for the page note, and which may also display the "your most recent tags" list as well as the "popular community tags" list. Also, a collections tab of the page note can include the "my collections list" and the "make a new collection" options, including an ability to select a privacy option for the new collection.

The "Info" tab displays information about the highlight note, preferably in a non-editable display. The fields may include: created on date; author of the note; date user saved; book title; author of the book; placement of note (i.e. its page); book rating; number of people who have saved the note; and number of likes note has received.

Filtering Notes

As mentioned, annotations may be filtered. This may be accomplished by using a filter dialog box which may be accessed by the user selecting the filter button while viewing annotations. FIG. 2 shows such a "filter" button. Various different filtering criteria may be employed for filtering the annotations. For example, these can include filtering by note type (e.g. book note or page note), filtering by tags so that only notes having a particular tag are displayed, filtering by collections so that only notes in a particular collection of the user are displayed, filtering by people so that only notes written by a particular person or persons are displayed, filtering by groups so that only notes written by members of a particular group or groups are displayed, and filtering by timeframe so that only notes written during a specified time period are displayed.

Figure 21:
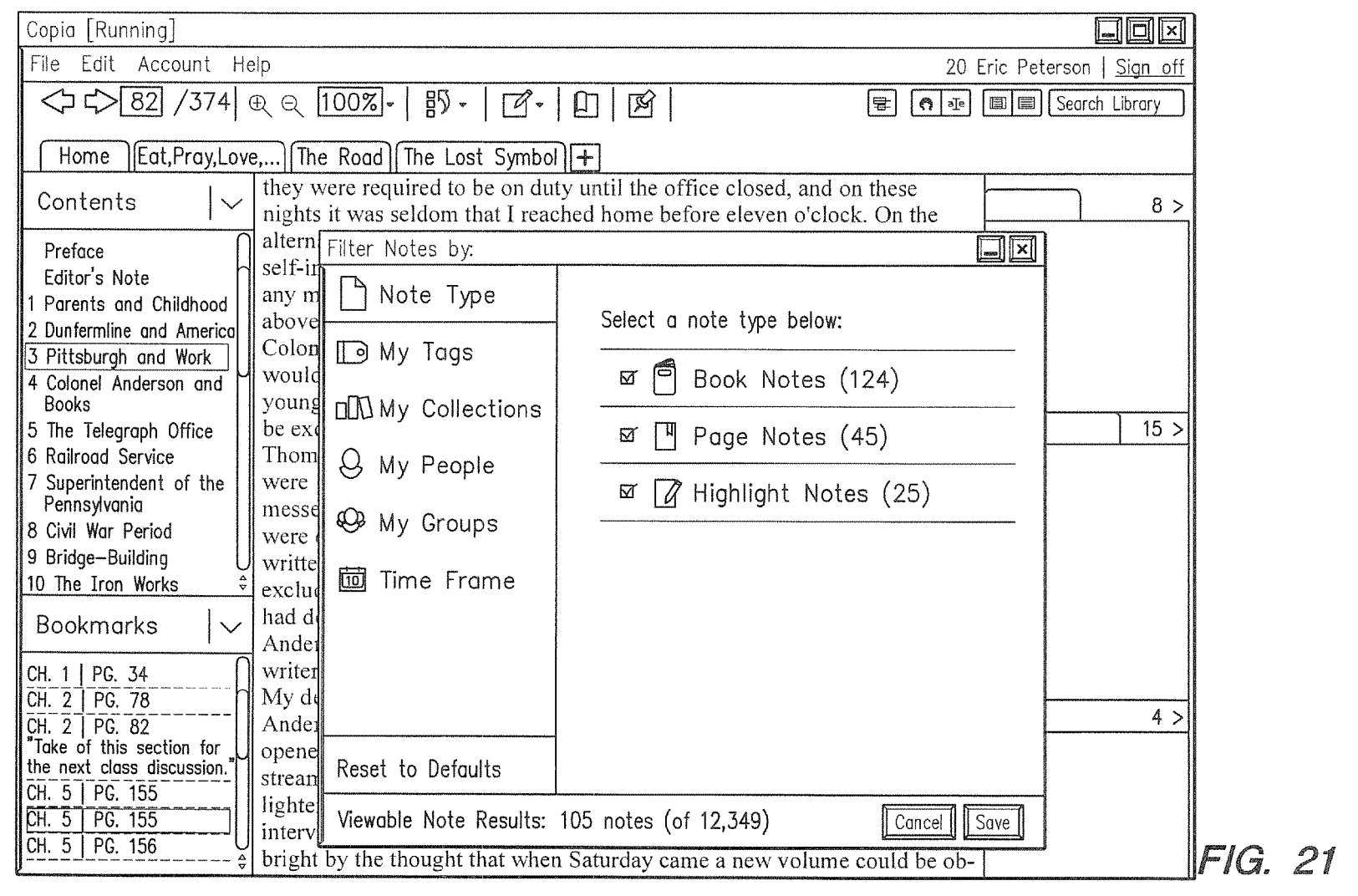

FIG. 21 illustrates a screen display for filtering notes by type in accordance with an embodiment of the present invention. For example, there can be three different note types available to filter by: book notes, page notes and highlight notes. The user may select any and all of these by clicking a checkbox next to each of them. Next to each note type in parenthesis is preferably a number that represents the total of that type of note for this book based on any other filtering already applied.

As shown in FIG. 21, filter options may be made available when the user clicks the "Filter" button on the header in the annotations panel. The following elements preferably appear on all Note Filtering screens: reset to defaults; results; cancel; and save. The reset to defaults link resets all filters to their default status. The results may be displayed along the bottom of the display area and can include a message informing the user how many notes are a result based on current filters. This may appear as a number of notes out of the total possible notes with no filtering. For example, the results may be displayed as "100 notes (of 10,000)". The user may selectively activate only one filtering criterion, but is also preferably allowed to simultaneously activate multiple filtering criteria. The cancel button closes the filter dialog box without applying any of the filters the user has selected since the filtering dialog box was opened. The save button closes the dialog box and saves any filter selections that the user has made since the dialog box was opened. After the filter dialog box is closed, the display shows the annotations according to the selected filtering criteria, as in FIGS. 2-5.

Figure 22:
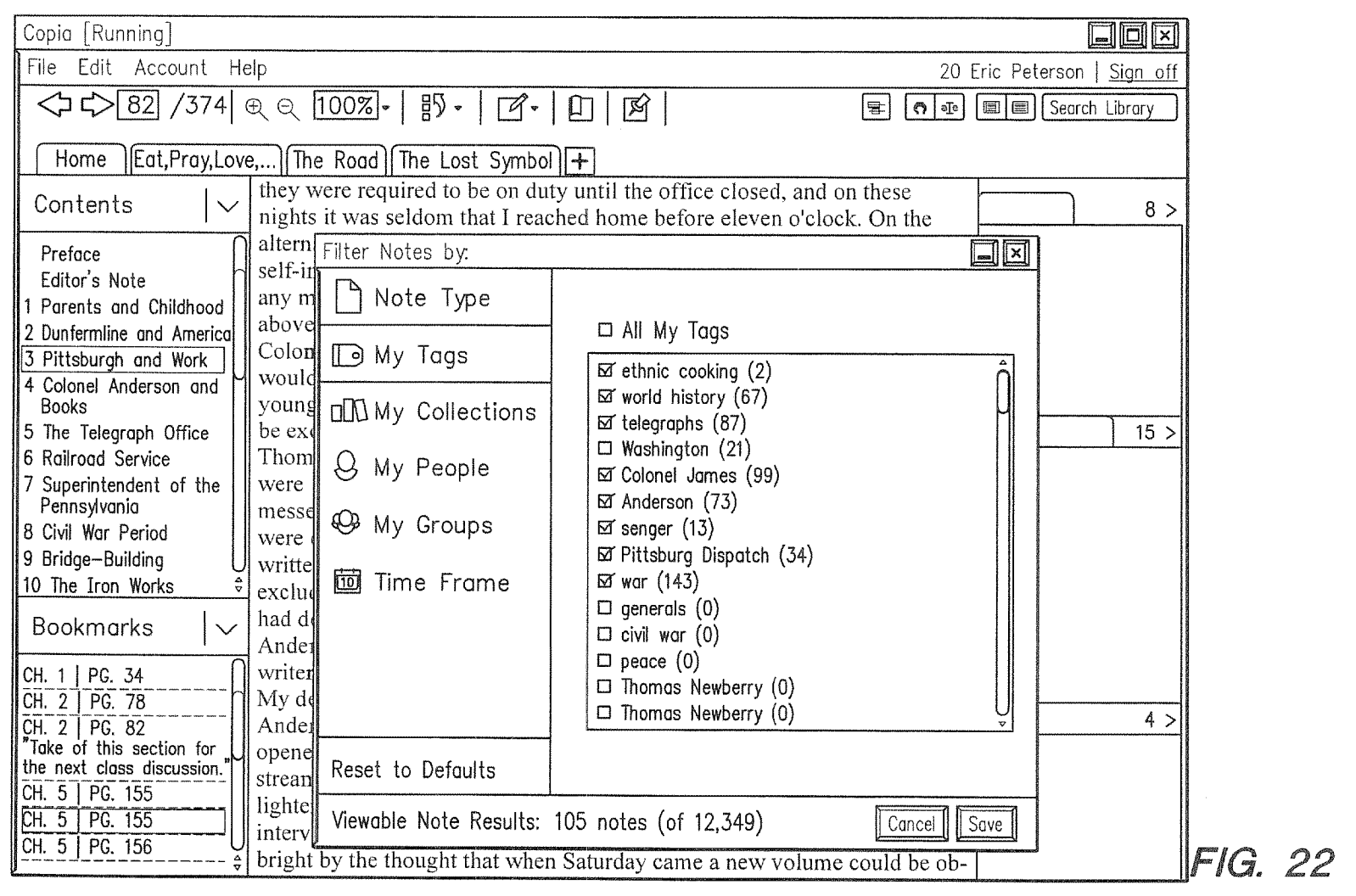

FIG. 22 illustrates a screen display for filtering notes by tags in accordance with an embodiment of the present invention. This allows the user to filter all notes for the current book based on the list of all of that user's tags. As shown in FIG. 22, a list of the tags is preferably displayed with a checkbox next to each tag. The user may select as many tags as the user wishes. The user may select all of the user's tags via a checkbox which is shown near the top of the dialog box and labeled "All My Tags." Next to each tag a total number of notes that match the tag using the other current filtering criteria is preferably displayed in parenthesis next to the tag.

In an embodiment, the user may sort the list of tags. For example, a sorting drop down menu may be provided. This may allow the list to be sorted alphabetical A to Z, alphabetical Z to A, by amount of results (most to least), or by amount of results (least to most).

Figure 23:
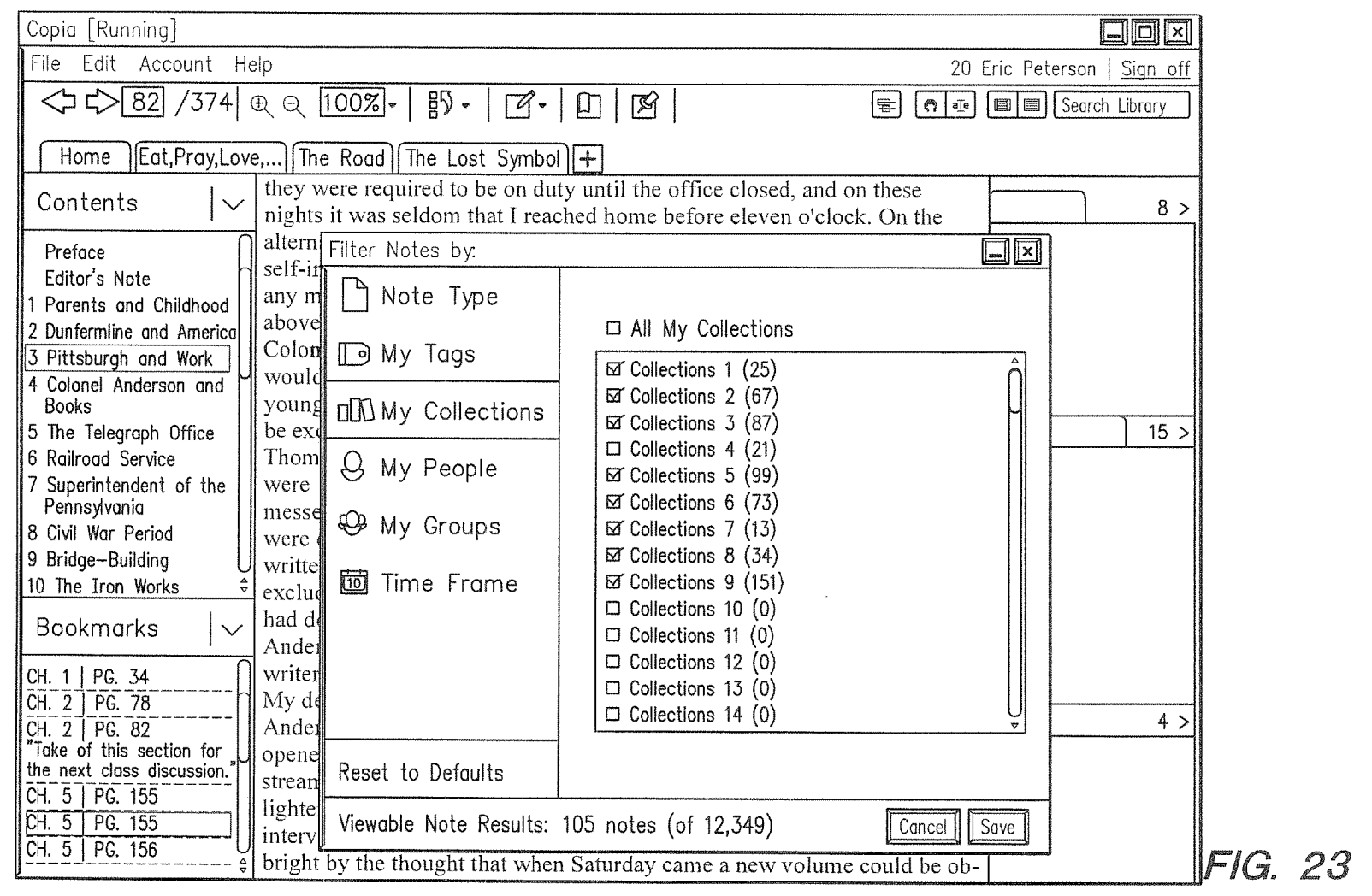

FIG. 23 illustrates a screen display for filtering notes by collections in accordance with an embodiment of the present invention. This allows the user to filter all notes for the book based the user's note collections. As shown in FIG. 23, a list of all of the user's note collections is preferably displayed by name with a checkbox next to each. The user may select as many collections as the user wishes. The user may select all of the user's collections via a checkbox which is shown near the top of the dialog box and labeled "All My Collections." Next to each collection a total number of notes in the collection according to the other current filtering criteria is preferably displayed in parenthesis next to the collection name. If a collection has no notes that apply it will preferably not have a checkbox. Default status is preferably all boxes checked.

In an embodiment, the user may sort the list of collections. For example, a sorting drop down menu may be provided. This may allow the list to be sorted alphabetical A to Z, alphabetical Z to A, by amount of results (most to least), or by amount of results (least to most).

Figure 24:
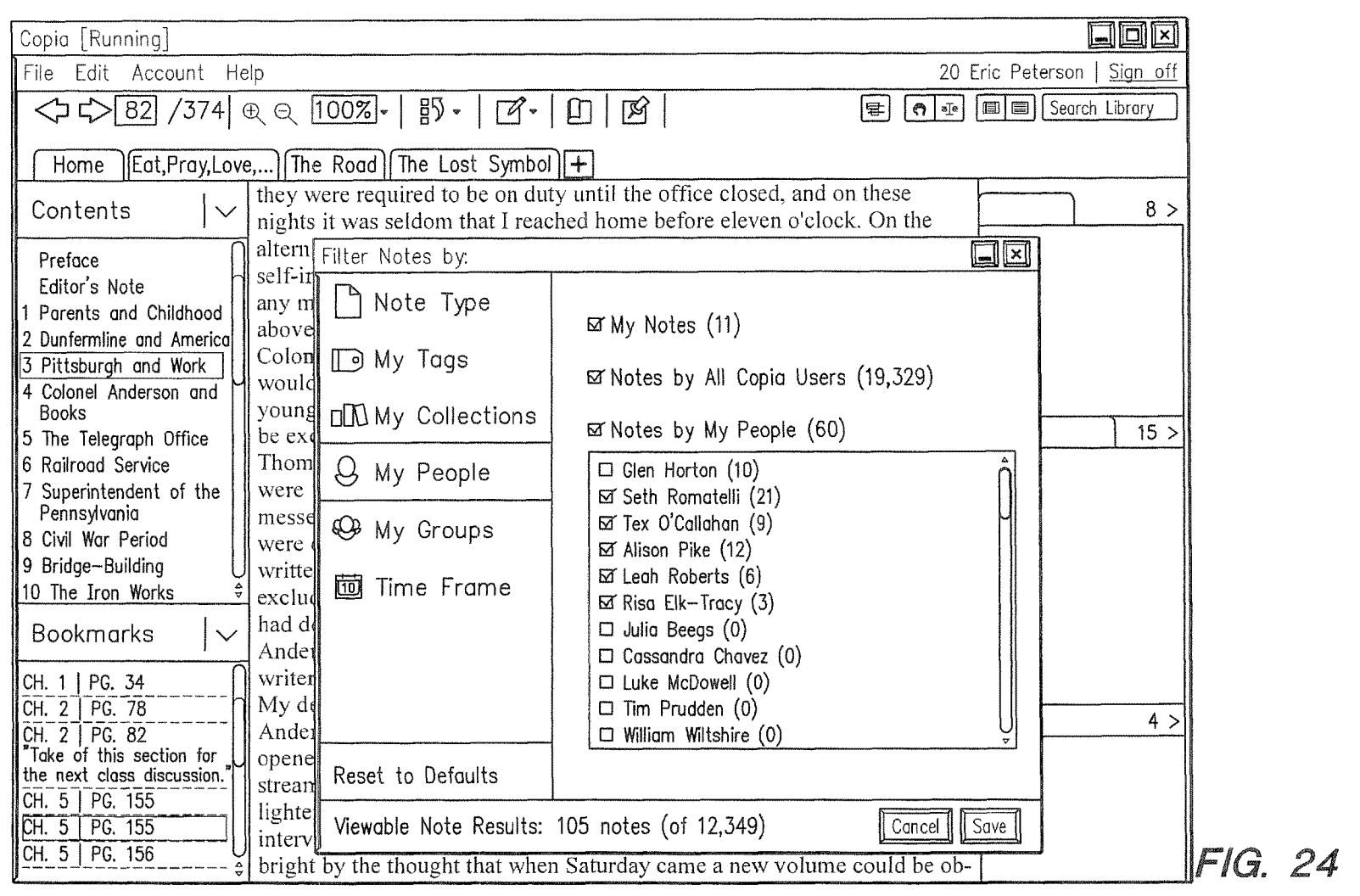

FIG. 24 illustrates a screen display for filtering notes by people in accordance with an embodiment of the present invention. This allows the user to filter notes according to people they are connected to.

A "My Notes" checkbox allows the user to include their own notes in their search. The total of their notes that fit the filter criteria is preferably displayed in parenthesis. This may default to checked. Also, an "All Community" checkbox allows the user to include notes from all users in their search. The total of all community notes that fit the filter criteria is preferably displayed in parenthesis. This may also default to checked.

A "Notes by My People" checkbox allows the user to include notes from specified other users (e.g. the user's friends) in the search. The total number of the notes that fit the filter criteria is preferably displayed in parenthesis. When this checkbox is selected, this preferably opens the user's "people" list. The people list can include a list of names with a check box next to each name. This allows the user to select among the persons listed as authors of notes to be included. Next to each person's name a total of the notes authored by that person and that fit the other filter criteria may be displayed in parenthesis. If a person has no notes that fit the filter criteria a checkbox preferably does not appear by that person's name. The default is preferably all boxes checked.

In an embodiment, the user may sort the list of people. For example, a sorting drop down menu may be provided. This may allow the list to be sorted alphabetical A to Z, alphabetical Z to A, by amount of results (most to least), or by amount of results (least to most).

Figure 25:
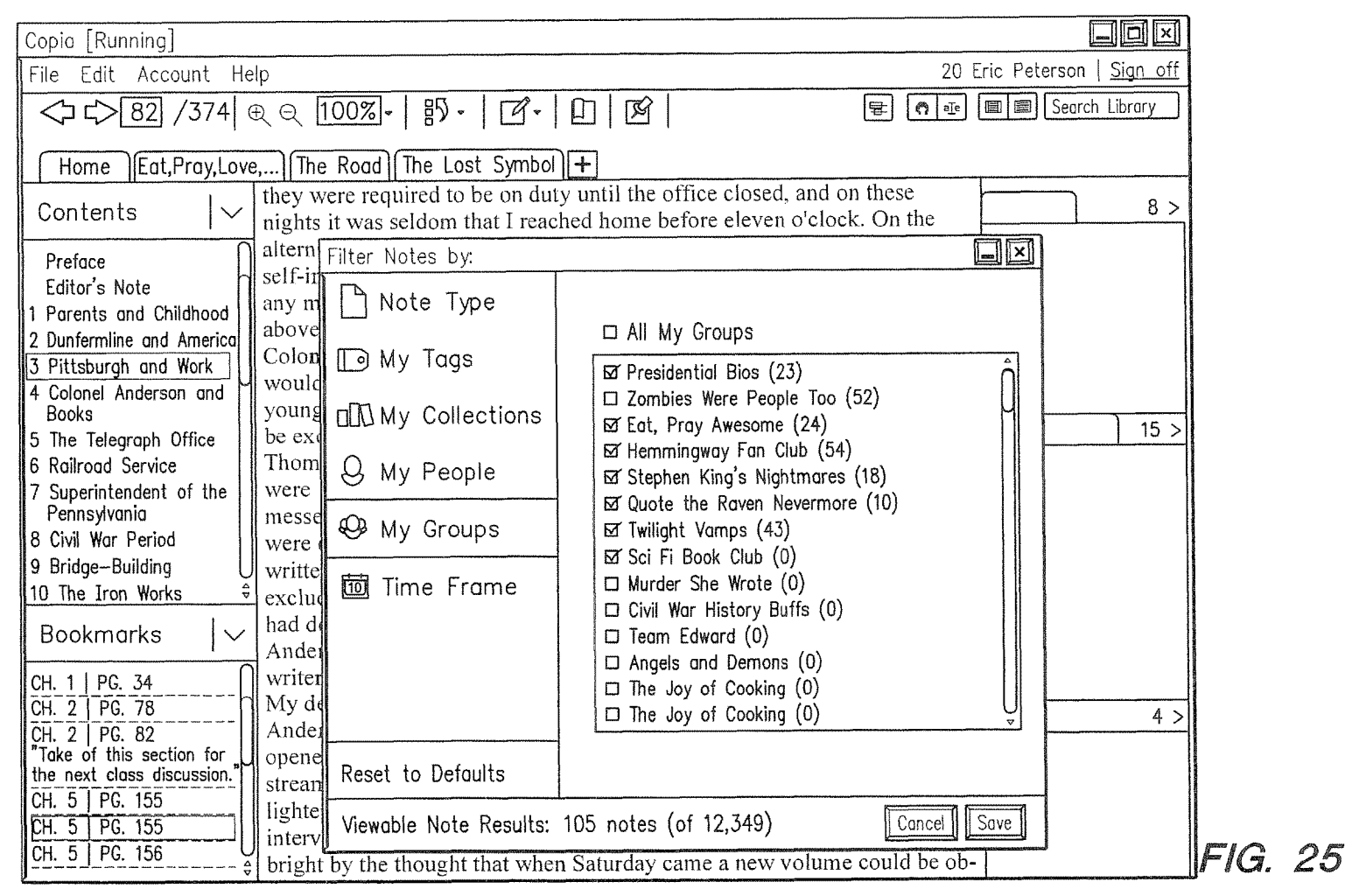

FIG. 25 illustrates a screen display for filtering notes by groups in accordance with an embodiment of the present invention. This allows the user to filter notes according to the groups they are connected to for which the current book is included in the group's library.

An "All. My Groups" checkbox allows the user to include notes from all of their groups in their search. The total of their notes that fit the sort criteria is preferably displayed in parenthesis. When this checkbox is selected, this preferably opens a group list for the user. The group list can include a list of group names with a check box next to each name. This allows the user to select among the groups listed as authors of notes to be included. Next to each group's name a total of the notes authored by members of that group and that fit the other filter criteria may be displayed in parenthesis. If a particular group has no notes that fit the filter criteria or the particular group does not have the book in its library, a checkbox preferably does not appear by that person's name. The default is preferably all boxes checked.

In an embodiment, the user may sort the list of groups. For example, a sorting drop down menu may be provided. This may allow the list to be sorted alphabetical A to Z, alphabetical Z to A, by amount of results (most to least), or by amount of results (least to most).

Figure 26:
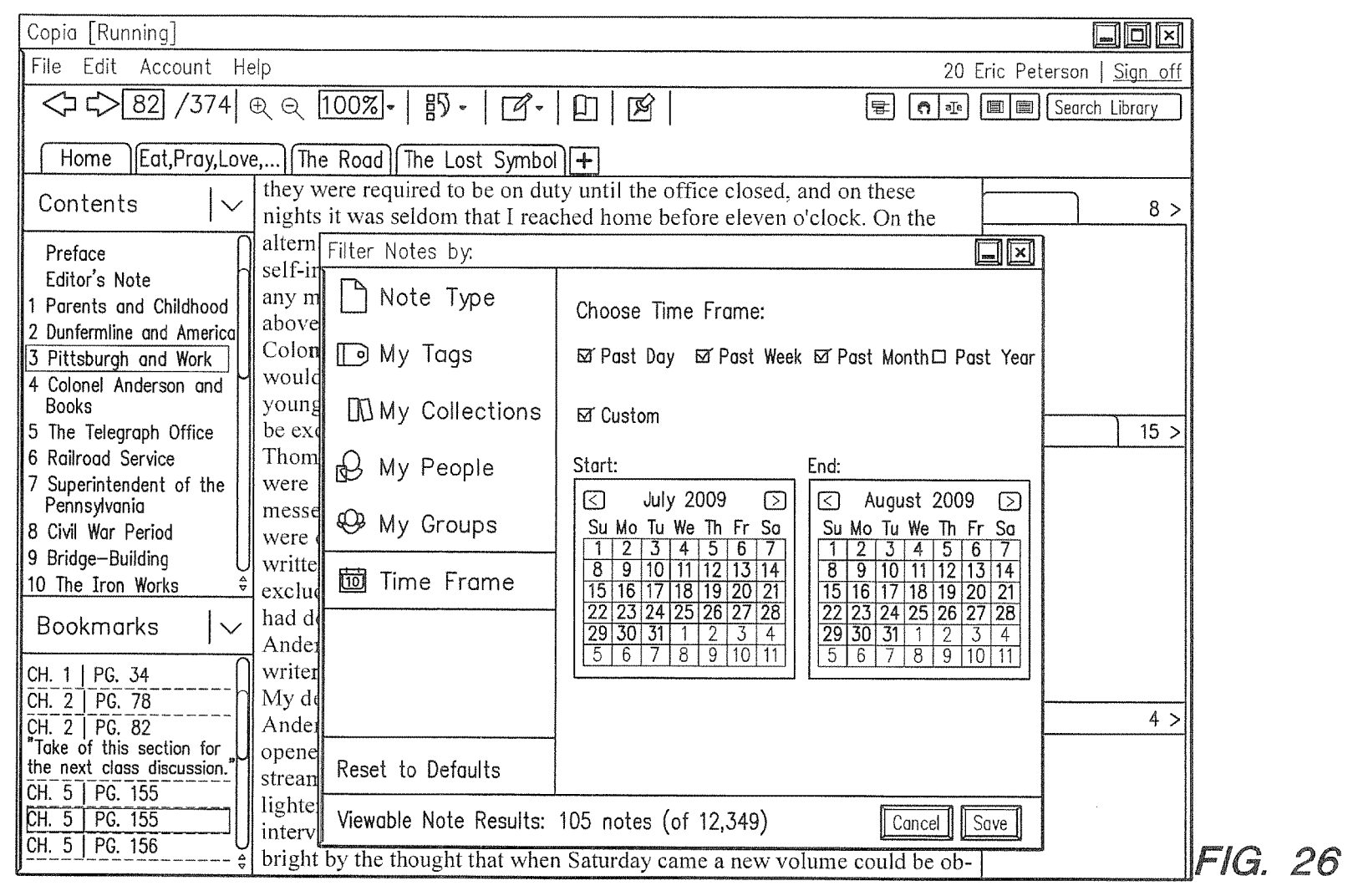

FIG. 26 illustrates a screen display for filtering notes by timeframe in accordance with an embodiment of the present invention. In an embodiment, there can be four radio buttons that allow the user to select a predetermined time frame relative to a current time and date. These can include: past day; past week; past month; and past year. Default may be none of the buttons being checked.

Alternatively, the user may preferably select a specified date range. As shown in FIG. 26, this option can be accessed by the user selecting a "custom" checkbox. This preferably defaults to not checked. When custom is selected, two calendars may appear, one for the start date and one for the end date. The user can click on a date for each calendar so that the range of dates between the start and end dates can be used for the filter. The end month preferably defaults to the current month. The start month preferably defaults to the previous month. Both calendars will preferably have forward and backward navigation arrows to allow the user to navigate through months.

The description above illustrates operation of embodiments of the invention and is not meant to limit the scope of the invention. It will be apparent to one skilled in the relevant art that variations will be encompassed by the spirit and scope of the invention and that the invention may be practiced in other embodiments. The particular division of functionality between the various system components described herein is merely exemplary. Thus, the methods and operations presented herein are not inherently related to any particular computer or other apparatus. Functions performed by a single system component may instead be performed by multiple components, and functions performed by multiple components may instead performed by a single component. It will also be apparent that process steps described herein can be embodied in software, firmware or hardware. Thus, the present invention or portions thereof may be implemented by apparatus for performing the operations herein. This apparatus may be specially constructed or configured, such as application specific integrated circuits (ASICs) or Field Programmable Gate Arrays (FPGAs), as a part of an ASIC, as a part of FPGA, or it may comprise a general-purpose computer selectively activated or reconfigured by a computer program stored on a computer readable medium that can be accessed and executed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, or any type of media suitable for storing electronic instructions, and or coupled to a computer system bus. Furthermore, the methods described in the specification may be implemented by a single processor or be implemented in architectures employing multiple processor designs for increased computing capability. Accordingly, the disclosure of the present invention is intended to be illustrative, but not limiting, of the scope of the invention.

What is claimed is:

1. A method of annotating digital content comprising:
   causing displaying of a menu including all of a first option to create an annotation such that the annotation is not associated with a volume of digital content, a second option to create the annotation such that the annotation is associated with an entire of the volume of digital content, a third option to create the annotation such that the annotation is associated with a page of the volume of digital content, and a fourth option to create the annotation such that the annotation is associated with selected text contained within the volume of digital content, the menu including a privacy setting associated with each of the first option, the second option, the third option, and the fourth option, and the second option, the third option, and the fourth option including a spoiler alert checkbox;
   receiving the annotation that is to be in association with the entire, page, or selected text of the volume of digital content, the annotation being created by a first user using a device that is remotely connected to a server via a network, and the annotation being stored in a computer-readable memory at the server in a manner that maintains a logical connection between the annotation and the associated entire, page, or selected text of the volume of the digital content;
   receiving an indication of a collection of annotations into which annotations are to be added, the collection of annotations being created by the first user indicating a desire to create the collection via a user interface and by providing a name for the collection via the user interface, the collection including a privacy setting associated therewith;
   adding the annotation into the collection of annotations so created;
   causing displaying of the entire, page, or selected text of the volume of digital content together with at least a name of the collection in which the annotation is included; and
   sharing the collection of annotations between the first user and one or more other users via the server, the collection of annotations being selected from among a plurality of collections of annotations.

2. The method according to claim 1, wherein the collection of annotations includes annotations associated with multiple different volumes of digital content.

3. The method according to claim 2, wherein a particular annotation of the collection of annotations is included in multiple collections of annotations.

4. The method according to claim 2, wherein the volumes of digital content are each selected from the group consisting of: a text document; an audio recording; a video presentation; and a multimedia presentation.

5. The method according to claim 1, wherein said sharing comprises receiving a selection from the first user of the privacy setting for the collection.

6. The method according to claim 1, further comprising selectively accessing annotations of a particular collection of annotations by specifying the particular collection of annotations from among a plurality of collections of annotations.

7. The method according to claim 6, wherein said specifying the particular collection of annotations is performed by receiving a selection of the displayed name of the particular collection selected using a cursor.

8. The method according to claim 6, wherein each annotation of the particular collection is associated with at least a portion of a volume of digital content and further comprising causing displaying of annotations of the particular collection of annotations without displaying the portions of digital content associated with the displayed annotations.

9. The method according to claim 1, further comprising receiving a comment in response to the annotation and storing the comment in a computer-readable memory in a manner that maintains a logical connection between the comment and the annotation, the comment being created by a second user.

10. The method according to claim 9, further comprising storing the comment in the server and wherein the comment is created at a device that is remotely connected to the server.

11. The method according to claim 1, further comprising:
    storing a plurality of annotations by the server in association with a plurality of volumes;
    filtering the annotations by specifying one or more collections; and
    causing displaying of the filtered annotations.

12. The method according to claim 11, wherein said filtering the annotations further comprises receiving an indication of one or more additional filtering criteria.

13. The method according to claim 1, wherein the volume of digital content comprises an e-book.

14. The method according to claim 1, wherein at least one collection of annotations includes an annotation that is not associated with a particular volume of digital content.

15. The method according to claim 1, wherein data storage at the server is assigned to the first user.

16. The method according to claim 15, further comprising storing one or more selected annotations at the data storage assigned to the first user.

17. The method according to claim 16, further comprising receiving an edit of one or more of the stored annotations, the edited annotation having been created by a user other than the first user.

18. The method according to claim 1, further comprising receiving an edit of an annotation, the edited annotation having been created by a user other than the first user.

19. A method of annotating digital content comprising:
    causing displaying of a menu including all of a first option to create an annotation such that the annotation is not associated with a volume of digital content, a second option to create the annotation such that the annotation is associated with an entire of the volume of digital content, a third option to create the annotation such that the annotation is associated with a page of the volume of digital content, and a fourth option to create the annotation such that the annotation is associated with selected text contained within the volume of digital content, the menu including a privacy setting associated with each of the first option, the second option, the third option, and the fourth option, and the second option, the third option, and the fourth option including a spoiler alert checkbox;
    receiving the annotation that is to be in association with the entire, page, or selected text of the volume of digital content, the annotation being created by a first user using a device that is remotely connected to a server via a network, and the annotation being stored in a computer-readable memory at the server in a manner that maintains a logical connection between the annotation and the associated entire, page, or selected text of the volume of the digital content;

receiving an indication of a collection of annotations into which annotations are to be added, the collection of annotations being created by the first user indicating a desire to create the collection via a user interface and by providing a name for the collection via the user interface, the collection including a privacy setting associated therewith;

adding the annotation into the collection of annotations so created;

providing access to annotations of the collection of annotations, said providing including specifying and causing displaying of the collection of annotations; and sharing the collection of annotations with one or more other users via the server, the collection of annotations being selected from among a plurality of collections of annotations.

20. The method according to claim 19, wherein the collection of annotations includes annotations associated with multiple different volumes of digital content.

21. The method according to claim 19, wherein a particular annotation of the collection of annotations is included in multiple collections of annotations.

22. The method according to claim 19, wherein said specifying the collection of annotations is performed by receiving a selection of a displayed name of the particular collection selected using a cursor.

23. The method according to claim 19, wherein annotations of the collection are each associated with at least a portion of a volume of digital content and further comprising causing displaying of annotations of the collection of annotations without displaying the portions of digital content associated with the displayed annotations.

24. The method according to claim 19, further comprising:
storing a plurality of annotations by the server in association with a plurality of volumes;
filtering the annotations by specifying one or more collections and one or more additional filtering criteria; and
causing displaying of the filtered annotations.

25. Non-transitory computer-readable media having stored thereon a software program, which when executed, causes one or more computers to perform a method of annotating digital content, the method comprising:
causing displaying a menu including all of a first option to create an annotation such that the annotation is not associated with a volume of digital content, a second option to create the annotation such that the annotation is associated with an entire of the volume of digital content, a third option to create the annotation such that the annotation is associated with a page of the volume of digital content, and a fourth option to create the annotation such that the annotation is associated with selected text contained within the volume of digital content, the menu including a privacy setting associated with each of the first option, the second option, the third option, and the fourth option, and the second option, the third option, and the fourth option including a spoiler alert checkbox;
receiving the annotation that to be in association with the entire, page, or selected text of the volume of digital content, the annotation being created by a first user using a device that is remotely connected to a server via a network, and the annotation being stored in a computer-readable memory at the server in a manner that maintains a logical connection between the annotation and the associated entire, page, or selected text of the volume of the digital content;
receiving an indication of a collection of annotations into which annotations are to be added, the collection of annotations being created by the first user indicating a desire to create the collection via a user interface and by providing a name for the collection via the user interface, the collection including a privacy setting associated therewith;
adding the annotation into the collection of annotations so created;
causing displaying of the entire, page, or selected text of the volume of digital content together with at least a name of the collection in which the annotation is included; and
sharing the collection of annotations with one or more other users via the server, the collection of annotations being selected by the first user from among a plurality of collections of annotations.

26. A system for annotating digital content comprising:
a server connected to a network, the server being configured to communicate with a user device via the network, the server including processing circuitry configured to:
cause displaying of a menu including all of a first option to create an annotation such that the annotation is not associated with a volume of digital content, a second option to create the annotation such that the annotation is associated with an entire of the volume of digital content, a third option to create the annotation such that the annotation is associated with a page of the volume of digital content, and a fourth option to create the annotation such that the annotation is associated with selected text contained within the volume of digital content, the menu including a privacy setting associated with each of the first option, the second option, the third option, and the fourth option, and the second option, the third option, and the fourth option including a spoiler alert checkbox,
receive the annotation that is associated with the entire, page, or selected text of the volume of digital content from the user device,
store the annotation in a computer-readable memory at the server in a manner that maintains a logical connection between the annotation and the associated entire, page, or selected text of the volume of the digital content,
create a collection of annotations into which annotations are to be added by receiving from the user device an indication of a desire to create a collection and a name for the collection, the collection including a privacy setting associated therewith,
add the annotation into the collection of annotations so created,
communicate with the user device so as to cause the user device to display the entire, page, or selected text of the volume of digital content together with at least a name of the collection in which the annotation is included, and
share the collection of annotations with one or more other users, the collection of annotations being selected by the first user from among a plurality of collections of annotations.

* * * * *